US012003391B2

United States Patent
Behera et al.

(10) Patent No.: US 12,003,391 B2
(45) Date of Patent: Jun. 4, 2024

(54) SYSTEM FOR AGGREGATING STATISTICS RELATING TO A LOGICAL FORWARDING ELEMENT

(71) Applicant: Nicira, Inc., Palo Alto, CA (US)

(72) Inventors: Somik Behera, San Francisco, CA (US); Henry Mai, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 17/525,019

(22) Filed: Nov. 12, 2021

(65) Prior Publication Data

US 2022/0078094 A1 Mar. 10, 2022

Related U.S. Application Data

(60) Division of application No. 15/891,506, filed on Feb. 8, 2018, now Pat. No. 11,212,200, which is a continuation of application No. 14/263,987, filed on Apr. 28, 2014, now Pat. No. 9,893,964.

(51) Int. Cl.
*H04L 43/062* (2022.01)
*H04L 43/026* (2022.01)
*H04L 43/04* (2022.01)
*H04L 45/586* (2022.01)

(52) U.S. Cl.
CPC .......... *H04L 43/062* (2013.01); *H04L 43/026* (2013.01); *H04L 43/04* (2013.01); *H04L 45/586* (2013.01); *Y02D 30/50* (2020.08)

(58) Field of Classification Search
CPC ...... H04L 43/062; H04L 43/026; H04L 43/04
See application file for complete search history.

(56) References Cited

U.S. PATENT DOCUMENTS

| 2004/0258062 | A1 | 12/2004 | Narvaez |
| 2005/0129019 | A1 | 6/2005 | Cheriton |
| 2005/0132044 | A1 | 6/2005 | Guingo et al. |
| 2005/0232230 | A1 | 10/2005 | Nagami et al. |
| 2006/0028999 | A1 | 2/2006 | Iakobashvili et al. |

(Continued)

FOREIGN PATENT DOCUMENTS

| JP | 2005311863 A | 11/2005 |
| WO | 2005106659 A1 | 11/2005 |

OTHER PUBLICATIONS

Author Unknown, "Managing Your Network with HP OpenView Network Node Manager," Manufacturing Part No. J1240-90058, Mar. 2001, 658 pages, Hewlett-Packard Company.

(Continued)

*Primary Examiner* — Ricky Q Ngo
*Assistant Examiner* — Stephen N Steiner
(74) *Attorney, Agent, or Firm* — Quarles & Brady LLP

(57) ABSTRACT

Some embodiments provide a system that implements a set of tools to define a set of one or more logical forwarding elements from a number of physical forwarding elements and a scalable framework to retrieve statistics relating each logical forwarding element. In some embodiments, the statistics relate to the logical ports of a logical forwarding element. The system of some embodiments allows a network administrator to retrieve a total packet count and byte count for one or more logical ports of the logical forwarding element, even though the logical ports may be distributed across multiple physical forwarding elements.

20 Claims, 19 Drawing Sheets

(56) References Cited

U.S. PATENT DOCUMENTS

| | | |
|---|---|---|
| 2006/0282895 A1 | 12/2006 | Rentzis et al. |
| 2008/0298568 A1 | 12/2008 | Karandikar |
| 2009/0135834 A1 | 5/2009 | Guntur |
| 2011/0113136 A1* | 5/2011 | Phaal .................. G06F 11/3476 709/224 |
| 2012/0236734 A1 | 9/2012 | Sampath et al. |
| 2013/0205376 A1* | 8/2013 | Narasimha ............ H04L 9/3247 726/6 |
| 2013/0258847 A1 | 10/2013 | Zhang et al. |
| 2013/0297768 A1* | 11/2013 | Singh ...................... H04L 43/00 709/224 |
| 2013/0329584 A1* | 12/2013 | Ghose .................. H04L 43/106 370/252 |
| 2013/0346592 A1 | 12/2013 | Kamble et al. |
| 2014/0281030 A1 | 9/2014 | Cui et al. |
| 2014/0325649 A1 | 10/2014 | Zhang |
| 2015/0263974 A1 | 9/2015 | Jain et al. |
| 2015/0312117 A1 | 10/2015 | Behera et al. |
| 2015/0312118 A1 | 10/2015 | Behera et al. |
| 2016/0191361 A1 | 6/2016 | Behera et al. |
| 2018/0167296 A1 | 6/2018 | Behera et al. |
| 2019/0173771 A1 | 6/2019 | Behera et al. |
| 2020/0195542 A1 | 6/2020 | Behera et al. |

OTHER PUBLICATIONS

Author Unknown, "AppLogic—Application Monitoring," Jul. 2007, 1 page, 3TERA, Inc.

Author Unknown, "AppLogic Features," Jul. 2007, 2 pages. 3TERA, Inc.

Author Unknown, "HP OpenView Network Node Manager SPI for IP Multicast software," May 2005, 6 pages, Hewlett-Packard Development Company.

Author Unknown, "OpenFlow Switch Specification, Version 1.1.0 Implemented (Wire Protocol 0x02)," Feb. 28, 2011, 56 pages, Open Networking Foundation.

Author Unknown, "SysUpTime User Manual," Mar. 18, 2007, 107 pages, version 3.5, iReasoning Inc.

Pfaff, Ben, et al., "The Open vSwitch Database Management Protocol," draft-pfaff-ovsdb-proto-00, Aug. 20, 2012, 34 pages, Nicira, Inc., Palo Alto, California, USA.

Phaal, Peter, et al., "sFlow Version 5," Jul. 2004, 46 pages, available at http://www.sflow.org/sflow_version_5.txt.

* cited by examiner

Aggregated Statistics Table 1615

| Aggr. Entity Name | Counter Index | Bytes | Packets |
|---|---|---|---|
|  |  |  |  |

Last Seen Flow Statistics Table 1620

| PFE UUID | Last Seen Flow Statistics Set |
|---|---|
|  |  |

1605

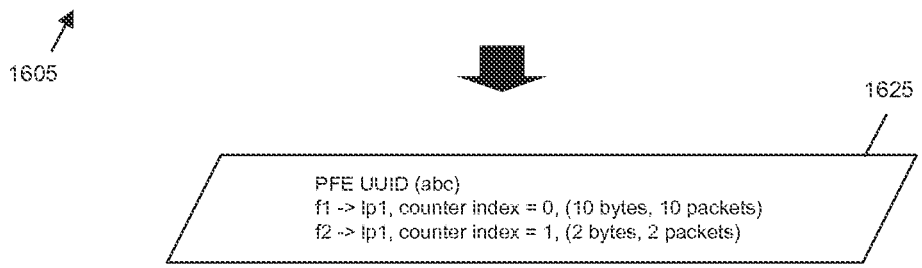

1625

PFE UUID (abc)
f1 -> lp1, counter index = 0, (10 bytes, 10 packets)
f2 -> lp1, counter index = 1, (2 bytes, 2 packets)

Aggregated Statistics Table 1615

| Aggr. Entity Name | Counter Index | Bytes | Packets |
|---|---|---|---|
|  |  |  |  |

Last Seen Flow Statistics Table 1620

| PFE UUID | Last Seen Flow Statistics Set |
|---|---|
| abc | f1 -> lp1, counter index = 0, (10 bytes, 10 packets), f2 -> lp1, counter index = 1, (2 bytes, 2 packets) |

1610

From Fig. 16

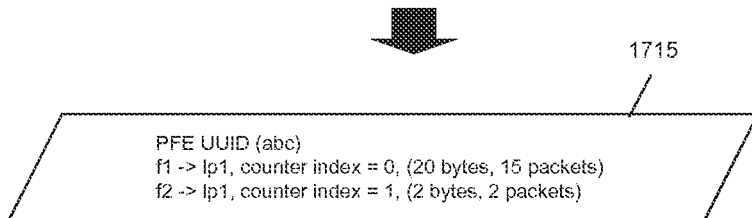

1715

PFE UUID (abc)
f1 -> Ip1, counter index = 0, (20 bytes, 15 packets)
f2 -> Ip1, counter index = 1, (2 bytes, 2 packets)

Aggregated Statistics Table 1615

| Aggr. Entity Name | Counter Index | Bytes | Packets |
|---|---|---|---|
| Ip1 | 0 | 10 | 5 |
| Ip1 | 1 | 0 | 0 |

Last Seen Flow Statistics Table 1620

| PFE UUID | Last Seen Flow Statistics Set |
|---|---|
| abc | f1 -> Ip1, counter index = 0, (20 bytes, 15 packets); f2 -> Ip1, counter index = 1, (2 bytes, 2 packets) |

1705

1720

PFE UUID (abc)
f1 -> Ip1, counter index = 0, (3 bytes, 3 packets)
f2 -> Ip1, counter index = 1, (5 bytes, 8 packets)

Aggregated Statistics Table 1615

| Aggr. Entity Name | Counter Index | Bytes | Packets |
|---|---|---|---|
| Ip1 | 0 | 10 | 5 |
| Ip1 | 1 | 3 | 6 |

Last Seen Flow Statistics Table 1620

| PFE UUID | Last Seen Flow Statistics Set |
|---|---|
| abc | f1 -> Ip1, counter index = 0, (3 bytes, 3 packets); f2 -> Ip1, counter index = 1, (5 bytes, 8 packets) |

SYSTEM FOR AGGREGATING STATISTICS RELATING TO A LOGICAL FORWARDING ELEMENT

CLAIM OF BENEFIT TO PRIOR APPLICATIONS

This application is a divisional application of U.S. patent application Ser. No. 15/891,506, filed Feb. 8, 2018, now published as U.S. Patent Publication 2018/0167296. U.S. patent application Ser. No. 15/891,506 is a continuation application of U.S. patent application Ser. No. 14/263,987, filed Apr. 28, 2014, now issued as U.S. Pat. No. 9,893,964. U.S. patent application Ser. No. 15/891,506, now published as U.S. Patent Publication 2018/0167296 and U.S. patent application Ser. No. 14/263,987, now issued as U.S. Pat. No. 9,893,964, are incorporated herein by reference.

BACKGROUND

Network virtualization entails creating logical, virtual networks that are decoupled from the underlying network hardware to ensure the network can better integrate with and support increasingly virtual environments. In recent years, enterprises have been adopting network virtualization at a growing rate to take advantage of the flexibility of software-based compute.

In some virtualized networks, network administrators can define logical forwarding elements (e.g., logical switches, logical routers) from one or more "physical" forwarding elements. A logical forwarding element is defined to create a logical division of the network, in which several related network hosts can communicate with one another. The network hosts are related to one another because, typically, they belong to a single entity, such as a user, customer, or tenant.

One of the challenges in implementing such a logical forwarding element involves retrieving its statistics (e.g., packet count, byte count). This can be a challenge because the logical forwarding element is a logical construct that does not exist in the real world. In the worst case scenario, the logical ports of the logical forwarding element can be completed distributed amongst multiple physical forwarding elements. To retrieve logical port stats, a network administrator has to figure out which physical ports correspond to which logical ports. The network administrator then has to individually query one or more storages to retrieve the physical ports' statistics. As such, gathering statistics relating to the logical forwarding element can be a time consuming endeavor.

In addition to logical forwarding element stats, the network administrator may want to retrieve other statistics. For instance, the network administrator may want to know the total statistics for a machine (e.g., virtual machine) or a group of machines. Such total statistics are useful because they can be used to determine the amount of traffic one or more machines of a customer is generating and possibly charge overages based on the amount of traffic.

BRIEF SUMMARY

Embodiments described herein provide a system that includes (1) a set of tools to define a set of one or more logical forwarding elements from a number of physical forwarding elements and (2) a scalable framework to retrieve statistics relating each logical forwarding element. In some embodiments, the statistics relate to the logical ports of a logical forwarding element. As an example, the system of some embodiments allows a network administrator to retrieve a total packet count and byte count for one or more logical ports of the logical forwarding element, even though the logical ports may be distributed across multiple physical forwarding elements.

In conjunction with logical port statistics or instead of them, the scalable framework of some embodiments allows network administrators to retrieve statistics relating different aggregated entities. In some embodiments, the aggregated entity is a pair of ports. The pair of ports can be physical ports of one or more physical forwarding elements. The pair of ports can be logical ports of one or more logical forwarding elements. In some embodiments, the aggregated entity is a machine or a group of machines. In some embodiments, the aggregated entity is an access control list (ACL).

In some embodiments, the scalable framework includes a flow stats exporter and an aggregator. A flow stats exporter is implemented on each physical forwarding element that participates in the accumulation of the statistics. In some embodiments, the flow stats exporter exports to the aggregator only flow statistics of each flow that is associated with a particular piece of metadata or tag. The flow stats exporter of some embodiments sends flow statistics to the aggregator periodically or when triggered. In some embodiments, the flow stats exporter dumps flow statistics in a set timed interval.

The aggregator of some embodiments is a component of the system that receives statistics from one or more flow stats exporters, and stores the statistics in a storage. The storage is a database, in some embodiments. Rather than simply storing the statistics, the aggregator accumulates or aggregates the statistic. This means that for a given entity or a given aggregated entity, the aggregator initially stores the statistics and then updates the statistics with each stats report from a flow stats exporter. As an example, when the initial report has a value x for the packet count and a subsequent report has a value y, the aggregator may update the initial statistics by adding the delta or difference (y-x) between those two values.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 16 conceptually illustrates an example of how the aggregator some embodiment aggregates statistics.

FIG. 17 conceptually also illustrates an example of how the aggregator some embodiment aggregates statistics.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system that implements (1) a set of tools to define a set of one or more logical forwarding elements from a number of physical forwarding elements and (2) a scalable framework to retrieve statistics relating each logical forwarding element. In some embodiments, the statistics relate to the logical ports of a logical forwarding element. As an example, the system of some embodiments allows a network administrator to retrieve a total packet count and byte count for one or more logical ports of the logical forwarding element, even though the logical ports may be distributed across multiple physical forwarding elements.

Figure 1:
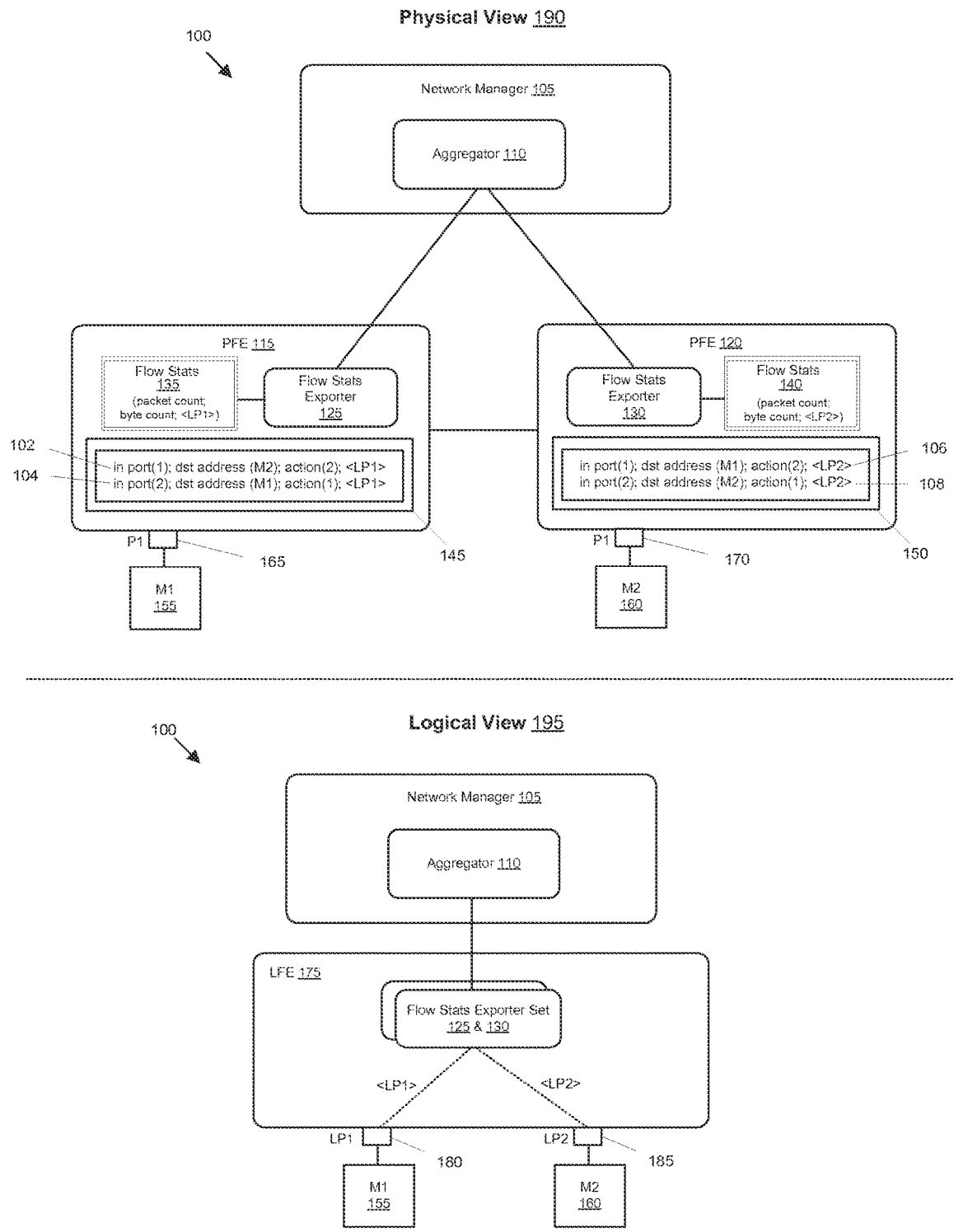
FIG. 1 illustrates a system for retrieving statistics relating to logical ports of a logical forwarding element.

For some embodiments of the invention, FIG. 1 illustrates a system 100 that aggregates statistics relating to logical ports of a logical forwarding element (LFE) 175. The figure conceptually shows in two different views, a physical view 190 and a logical view 195, how the system 100 accumulates the statistics. The physical view 190 shows a network manager 105 and several physical forwarding elements (PFEs) 115 and 120. The network manager 105 is also shown in the logical view 195 along with the LFE 175.

The PFE (115 or 120) is a component of the system 100 that processes packets for one or more machines (also referred to herein as network hosts). A machine can be a virtual machine (VM) or a physical machine (e.g., a dedicated machine). The term "packet" is used herein refer to a collection of bits in a particular format that is sent across a network. Typically, the packet includes header, user data, and a trailer. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The innermost header is usually the last header of the headers before the payload of the packet. For the network that implements the protocol of the outer-most header of a packet, the network considers only the outer-most header of the packet as the header and the other headers and the user data of the packet are together considered as the payload of the packet. One of ordinary skill in the art will recognize that the term "packet" may be used herein to refer to various formatted collections of bits that may be sent across a network, such as Ethernet frames, TCP segments, UDP datagrams, IP packets, etc.

The PFE (115 or 120) can be a Layer 2 switch or a Layer 3 router, in some embodiments. The PFE of some embodiments is a hardware forwarding element or a software forwarding element. The hardware forwarding element has application-specific integrated circuits (ASICs) that are specifically designed to support in-hardware forwarding. Different from a hardware forwarding element, the software forwarding element may operate on an x86 box or a computing device (e.g., a host machine or a hypervisor). The term "physical forwarding element" is used herein to differentiate it from a logical forwarding element. In other words, the term "physical" forwarding element is not used herein to differentiate a hardware forwarding element from a software forwarding element.

In some embodiments, the PFEs 115 and 120 are edge forwarding elements or tunnel endpoints. An edge forwarding element represents a last forwarding element before a set of one or more end machines. The edge forwarding element is directly connected to the set end machine. As such, the edge forwarding element has an advantage over a non-edge forwarding element in accumulating statistics for the set of end machines. That is, the edge forwarding element can more easily monitor traffic coming from and going to an end machine than the non-edge forwarding element. This is particular useful in cases where the system 100 accumulates statistics for an aggregated entity, such as a machine or a group of machines.

In the example of FIG. 1, the PFEs 115 and 120 operate in conjunction with one another to collectively implement the LFE 175. The PFEs 115 and 120 may implement multiple LFEs (e.g., logical switches or logical routers) for different logical networks of different tenants, users, departments, etc. that use the same shared computing and networking resources. To simply the description, only two PFEs are shown in the figure, but there can be additional PFEs that implements the LFEs. Conceptually, a single PFE can be used to define multiple LFEs. For instance, one router can be partitioned into multiple different logical routers to provide network services for different tenants.

To process packets, the PFE (115 or 120) of some embodiments maintains a number of flows in a flow table, memory (e.g., content-addressable memory (CAM) or ternary CAM (TCAM)), or a datapath cache (145 or 150). Each flow is essentially a rule that specifies how the PFE should process each packet with certain header field values. The flow includes a set of match fields and at least one action to perform on each packet that has a set of header values that match the set of match field values. Typically, the action specifies dropping the packet or outputting the packet to one or more of the PFE's output ports. For instance, when the PFE 115 receives a packet, it performs a packet classification operation (e.g., a hash-based lookup operation) to find a matching flow from the datapath cache 145, and outputs the packet to a particular port (e.g., port 1 or port 2) according to the matching flow's action.

For each flow, the PFE (115 or 120) of some embodiments maintains statistics. Examples of such statistics include packet count and byte count. In some embodiments, the packet count is a total count of the number of packets that were processed (e.g., sent or received) with a given flow. The byte count of some embodiments is the total number of bytes processed (e.g., sent or received) with the given flow. The PFE of some embodiments also maintains other information relating to each flow. As an example, the PFE may maintain a duration of the flow. The PFE of some embodiments also maintains a timestamp of when the flow was last used to process a packet. The timestamp may be used to dump the flow from the datapath cache if the flow has not been used for a specified period of time. If the same flow is added again to the datapath cache, the statistics associated with the flow will be reset, in some embodiments.

To accumulate statistics, the system 100 includes at least one flow stats exporter (125 or 130) and an aggregator 110. A flow stats exporter is implemented on each PFE that participates in the accumulation of the statistics. The flow stats exporter of some embodiments sends flow statistics to the aggregator periodically or when triggered. In some embodiments, the flow stats exporter dumps flow statistics in a set timed interval. For instance, the flow stats exporter may send flow statistic to the aggregator each second, some millisecond, or some other set time period. In some embodiments, the flow stats exporter can be configured to export at a specified time interval. That is, a network administrator can input into the system 100 a time interval that the flow stats exporter (125 or 130) uses to export the statistics in a periodic basis. Alternatively, the flow stats exporter of some embodiments is hard-coded with a time interval (e.g., default time interval).

In some embodiments, the flow stats exporter (125 or 130) exports to the aggregator 110 only flow statistics of each flow that is associated with a particular piece of metadata (also referred to herein as a tag). As an example, the PFE 115 may have many flows in the datapath cache 145 at some point in time, and the flow stats exporter 125 may only dump statistics of flows (e.g., the flows 102 and 104) that are associated with a tag. The flow stats exporter may also dump stats of all the different flows that are associated with different tags. To support the stats aggregation, the PFE may store the statistics of each flow along with a set of one or more tags associated with that flow.

The aggregator 110 of some embodiments is a component of the system that (1) receives statistics from one or more flow stats exporters, and (2) stores the statistics in a storage. The storage is a database, in some embodiments. Rather than simply storing the statistics, the aggregator accumulates or aggregates the statistic. This means that for a given entity or a given aggregated entity, the aggregator initially stores the statistics and then updates the statistics with each stats report from a flow stats exporter. As an example, when the initial report has a value x for the packet count and a subsequent report has a value y, the aggregator may update the initial statistics by adding the delta or difference (y-x) between those two values.

In some cases, there can be discontinuity between a current report and the aggregated stats. For instance, a stats counter of a flow may have went backwards, duration of the flow in the current report is less that the duration from the previous report, and/or the start time of the flow is off. Several such examples of detecting discontinuity will be described in detail below by reference to FIG. 16-18.

In some embodiments, the aggregator 110 is also used to retrieve statistics from the storage. For instance, when there is a request for statistic relating to a logical port or an aggregated entity, the aggregator in some such embodiments queries the storage to retrieve the requested statistics. Alternatively, the system 100 of some embodiments separates the statistics aggregation from the statistics retrieval. In other words, the system can include separate components that perform the aggregation and the retrieval.

The network manager 105 of some embodiments is used to manage and configure the PFEs 115 and 120. The network manager may perform the management by sending (e.g., pushing) management data (e.g., bridge information, LFE information, virtual interface information, tunnel information, etc.) to the PFEs. The network manager of some embodiments performs the configuration by sending (e.g., pushing) flows to the PFEs. Instead of sending flows, the network manager 105 of some embodiments exchanges forwarding state information that is translated into a set of flows at the PFEs.

In the example of FIG. 1, the aggregator 110 is shown as being implemented on the same computing device as the network manager 105. However, the aggregator can be implemented on any machine, virtual or dedicated. As an example, the aggregator can be implemented on a hypervisor, a service virtual machine (VM), a separate stats aggregating machine, etc. The aggregator can also be implemented on a same device or hypervisor as a software or virtual forwarding element (e.g., the PFE 115 or 120). The aggregator can be an application or a plug-in component that runs on a particular operating system.

Different from the physical view 190, the logical view 195 shows the LFE 175. In some embodiments, the LFE is defined to create a virtual network for several network hosts that are related to one another. The network hosts may be related because they belong to the same user, department, tenant, or enterprise. The LFE is defined at least partially by several flows that allow the related network hosts to communicate with one another. In some embodiments, the LFE is also defined by a logical forwarding element identifier (LFEID) that is added to headers of packets belong to one entity, such as a user, department, tenant, or enterprise. The LFEID is also referred to as a tenant identifier, a network identifier, a virtual extensible local area network (VXLAN) identifier, or a tunnel key, in some embodiments. Despite its limited size, the virtual LAN (VLAN) tag can be used as the LFEID, in some embodiments.

Having described the components of the system 100, example operations of the system will now be described by reference to the physical and logical views 190 and 195 that are illustrated in FIG. 1. The physical view 190 shows the network manager 105, the PFEs (115 and 120), and the machines (155 and 160). The machine 155 is connected to port one 165 of the PFE 115, while the machine 160 is connected to the port one 170 of the PFE 120. Depending on the PFE and its supported features, the port may be an actual physical port (e.g., to plug a machine into) or a virtual port. Irrespective of whether the port is physical or virtual, it will now be referred to as a "physical" port to differentiate it from a logical port.

The physical view 190 also shows that the network manager 105 has sent flows 102-108 or instructions that are translated to flows to the PFEs 115 and 120. Specifically, the PFE 115 is configured with two flows 102 and 104 to process packets associated with the machine 155, while the PFE 120 is configured with two other flows 106 and 108 to process packets associated with the machine 160. The two flows 102 and 104 in datapath cache 145 of the PFE 115 are used to process inbound and outbound traffic associated with the machine 155. That is, the flow 102 is used forward packets from the machine 155 to the machine 160, and the flow 104 is used to forward packets from the machine 160 to the machine 155. The PFE shows similar flows 106 and 108; however, they are defined for the machine 160.

The physical view 190 also shows that the flows 102-108 are tagged in some manner to identify different logical ports. In particular, the flows 102 and 104 are tagged with one tag that identifies logical port one (e.g., "LP1"), and the flows 106 and 108 are tagged with another tag that identifies logical port two (e.g., "LP2"). In some embodiments, the tag's value can be an aggregation identifier (e.g., a universally unique identifier (UUID) of a logical port) or can be any other value that that has meaning within the system to collect statistics. In the example of FIG. 1, both the flows of each PFE (115 and 120) have been tagged with the same logical port identifier.

In some embodiments, the system tracks both inbound and outbound traffic of ports (e.g., logical ports) by using a counter index. For instance, the counter index of 0 can be for inbound data and 1 for outbound data. However, in some embodiments, the counter index is opaque to the system except for the network manager (e.g., the NVP controller described below). That is, the controller could have chosen anything for the counter indices. In some embodiments, the counter index is also limited to the range of 0 to 255. The range can be larger if necessary, in some embodiments. Additionally, since the counter index is opaque to the system of some embodiments, for access control lists (ACLs), the same 0 and 1, can represent allow and deny traffic, respectively. This is because the network manager (e.g., the NVP controller) understands what UUIDs correspond to what kind of entity they are. Thus, the network manager understands the counter indices for the different types of entities (e.g., logical port, port pairs, ACLs, etc.).

In the physical view 190, the flow stats exporter 125 operates on the PFE 115 to read flow statistics 135 from storage (e.g., memory) and send the statistics to the aggregator 110. Likewise, the flow stats exporter 130 operates on the PFE 120 to read flow statistics 140 from storage and send the statistics to the aggregator 110. As mentioned above, each flow stats exporter (125 or 130) may send the statistics in a periodic basis or when triggered. The aggregator 110 operates on the network manager 105 to accumulate statistics from the flow stats exporters 125 and 130.

The logical view 195 shows the LFE 175 that is implemented by the PFEs 115 and 120. The machines 155 and 160 are conceptually shown as being attached to logical ports one and two 180 and 185 of the LFE 175, respectively. The LFE 175 is associated with the flow stats exporter set 125 and 130. The exporter set sends flow statistics and any updates to the aggregator 110. The flow statistics relate to the logical ports one and two of the LFE. The dashed arrow and the tag, shown between the flow stats exporter set 125 and 130 and each logical port (180 or 185), indicate that logical port statistics are collected indirectly through the tagged flow statistics (135 and 140).

There are several reasons why statistics relating to such logical ports are derived indirectly through flow statistics. One of the main reasons is because the LFE 175 is a logical construct that is defined by its flows. Another reason is that the logical ports 180 and 185 of the LFE 175 are logical constructs that do not exist in the real world. As mentioned above, in the worst case scenario, the logical ports may be distributed across every PFEs that implements the LFE. In the example of FIG. 1, the logical ports 180 and 185 are distributed across the PFEs 115 and 120. Also, at least one logical port number 185 of the LFE 175 does not match the physical port number 170 of the PFE 120. Accordingly, the system of some embodiments provides an easy means to quickly retrieve logical port stats without having to identify which physical ports corresponds to which logical ports.

Figure 2:
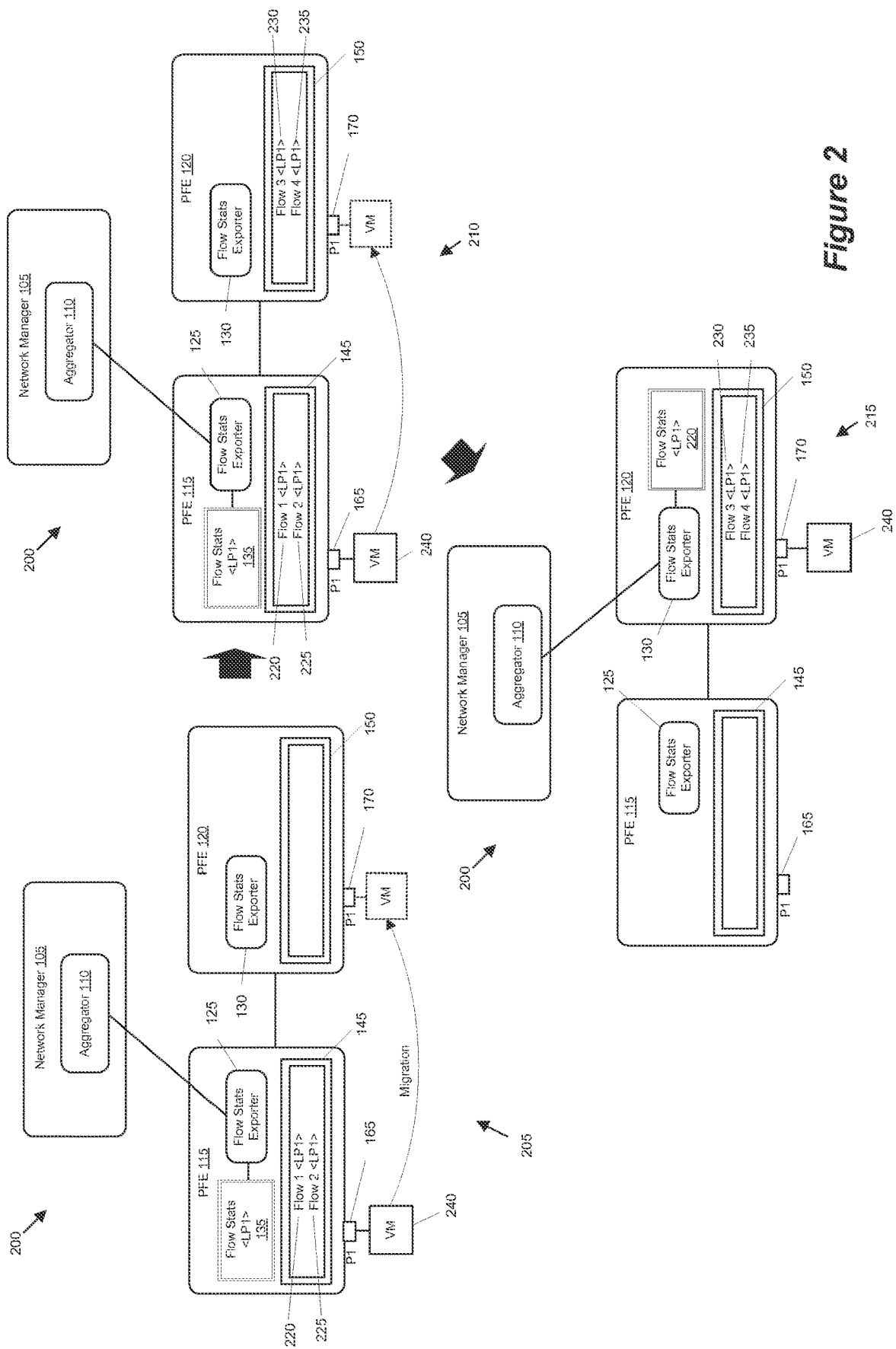
FIG. 2 provides an illustrative example of how a logical port of a logical forwarding element can be defined by two separate physical ports of two separate physical forwarding elements.

Another reason why the system uses flows is that there may be no one-to-one correlation between a physical port and a logical port. In some cases, one logical port can be defined by two or more physical ports. FIG. 2 provides an illustrative example of how a logical port of a LFE can be defined by two separate physical ports of two separate PFEs. Three stages 205-215 of the system 200 are shown in this figure. The figure includes the network manager 105 and the PFEs 115 and 120 described above by reference to FIG. 1.

The first stage 205 conceptually shows that a migration operation has been initiated. The operation moves a virtual machine (VM) from one computing device (host device) to another computing device. In some embodiments, the network manager includes a component (e.g., a migration tool) to perform live migration of VMs. In some embodiments, live migration entails moving an entire running VM (e.g., the VM 240) from one physical server to another, without downtime. The VM retains its network identity and connections, ensuring a seamless migration process. The migration may also entail transferring the VM's active memory and precise execution state (e.g., over a high-speed network), allowing the VM to switch from running on a source hypervisor host to a destination hypervisor host.

In the example of FIG. 2, the migration operation entails connecting the VM 240 from physical port one 165 of the PFE 115 to physical port one 170 of the PFE 120. This is conceptually shown with the dashed line that indicates the VM 240 being connected to port one 170 of the PFE 120 from port one 165 of the PFE 115. The first stage 205 also shows that prior to the initiation of the migration operation the PFE 115 maintained two flows 220 and 225 that are tagged to track logical port statistics. Also, prior to the initiation, the PFE 120 maintains no tagged flows to track the statistics of the same logical port.

The second stage 210 shows the system 200 during migration of the VM 240 from one computing device to another. As shown, during migration, the VM 240 may be at some point in time connected to both port one 165 of the PFE 115 and port one 170 of the PFE 120. This is primarily done prevent data loss. To support the new connection, the datapath cache 150 of the PFE 120 is populated with several flows 230 and 235 that correspond to the flows 220 and 225 in the datapath cache 145 of the PFE 115.

Hence, the second stage 210 shows that one logical port can sometimes be defined two separate physical ports 165 and 170 of two separate PFEs 115 and 120. In addition, the second stage 210 shows that statistics relating to one logical port can come from two flow stats exporters 125 and 130 on the two separate PFEs 115 and 120.

The third stage 215 shows the system 200 after migrating the machine 240 from one computing device to another. As the VM 240 is no longer connected to the port one 165 of the PFE 115, the flows 220 and 225 in the datapath cache 145 has timed out. The flows 230 and 235 in the datapath cache 150 of the PFE 120 remain in the cache to process packets for the VM 240. The flow stats exporter 130 remains active on the PFE 120 to export statistics relating to the logical port. On the other hand, the flow stats exporter 125 of the PFE 115 does not export any statistics relating to the logical port. This is because the VM 240 is no longer connected to the PFE 115.

Figure 3:
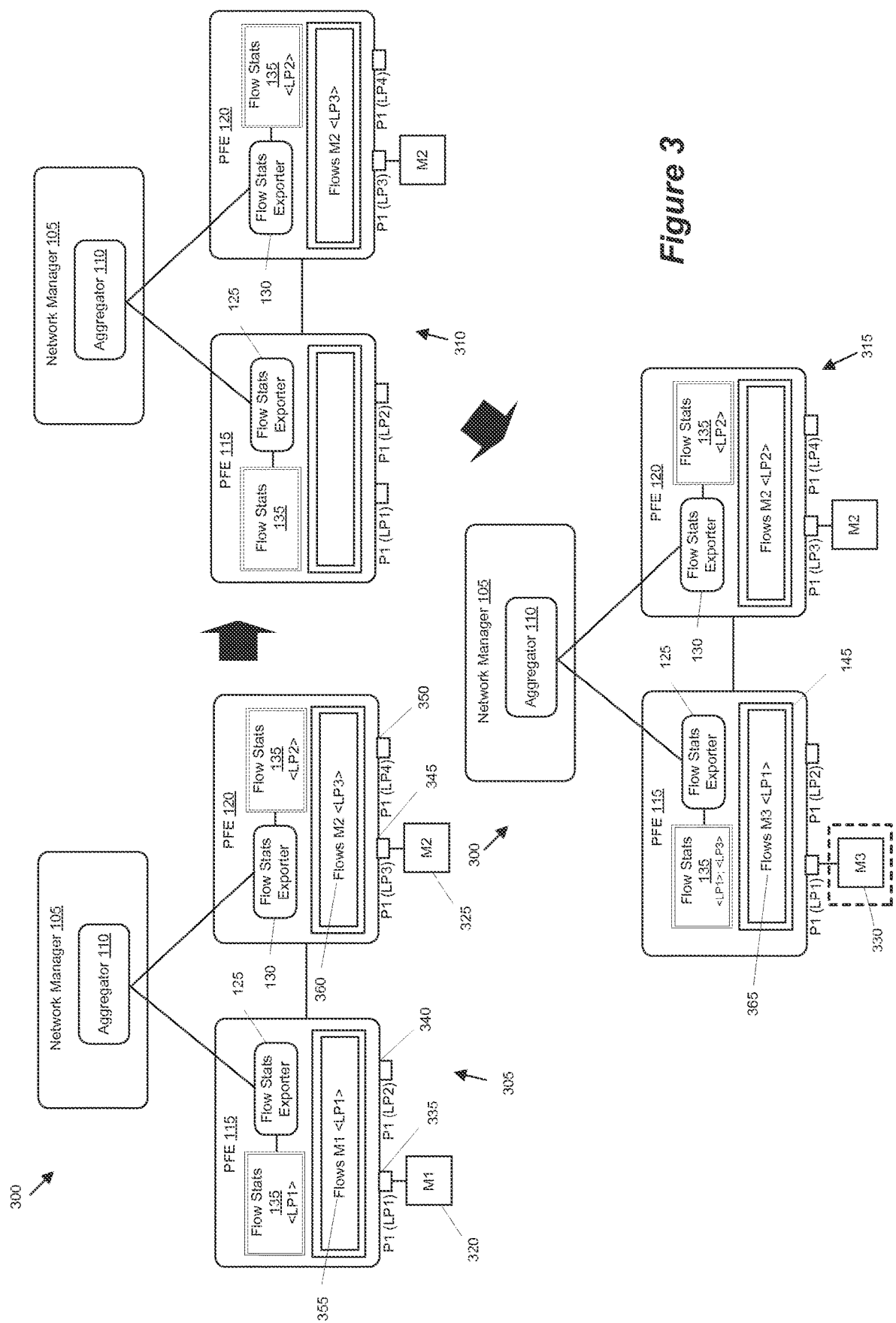
FIG. 3 provides an illustrative example of how several machines can be connected to different router ports at different at different times.

In some case, there may be no one-to-one correlation between a port (e.g., physical or logical) and a machine. FIG. 3 provides an illustrative example of how several machines can be connected to different router ports at different at different times. Three stages 305-315 of the system 300 are shown in this figure. The figure includes the network manager 105 and the PFEs 115 and 120 described above by reference to FIG. 1. In this example, the physical ports one and two 335 and 340 of the PFE 115 correspond to logical ports one and two of the LFE (not shown). The physical ports one and two 345 and 1550 of the PFE 120 correspond to logical ports three and four of the same LFE.

In the first stage 305, the machine 320 is connected to the logical port one via the physical port one 335 of the PFE 115. The machine 325 is connected to the logical port three via the physical port one 345 of the PFE 120. The first stage 305 also shows several flows 355 and 360 that are tagged to track statistics of the logical ports one and three of the LFE.

The second stage 310 shows that the PFE 115 is no longer processing packets that are associated with the machine 320. Here, the machine 320 is not even connected to any physical or logical port. This can occur if the machine 320 is moved or silent for a set period of time. For instance, if the machine is idle for the set period of time, the LFE might remove the machine's address. The LFE might add the address again if it detects that machine 320 is connected to one of its logical ports.

The third stage 315 shows a different machine 330 being connected to the port one of the PFE (and the LFE). To continue tracking stats of the logical port one, the datapath cache 145 of the PFE 115 shows that each flow associated with the machine 330 has been tagged with a logical port identifier.

In conjunction with logical port statistics or instead of them, the system of some embodiments provides tools to retrieve statistics relating different aggregated entities. In some embodiments, each aggregated entity may be defined by associating multiple related flows with the same aggregation identifier or key. Several examples of different aggregated entities will now be described below by reference to FIGS. 4-6.

Figure 4:
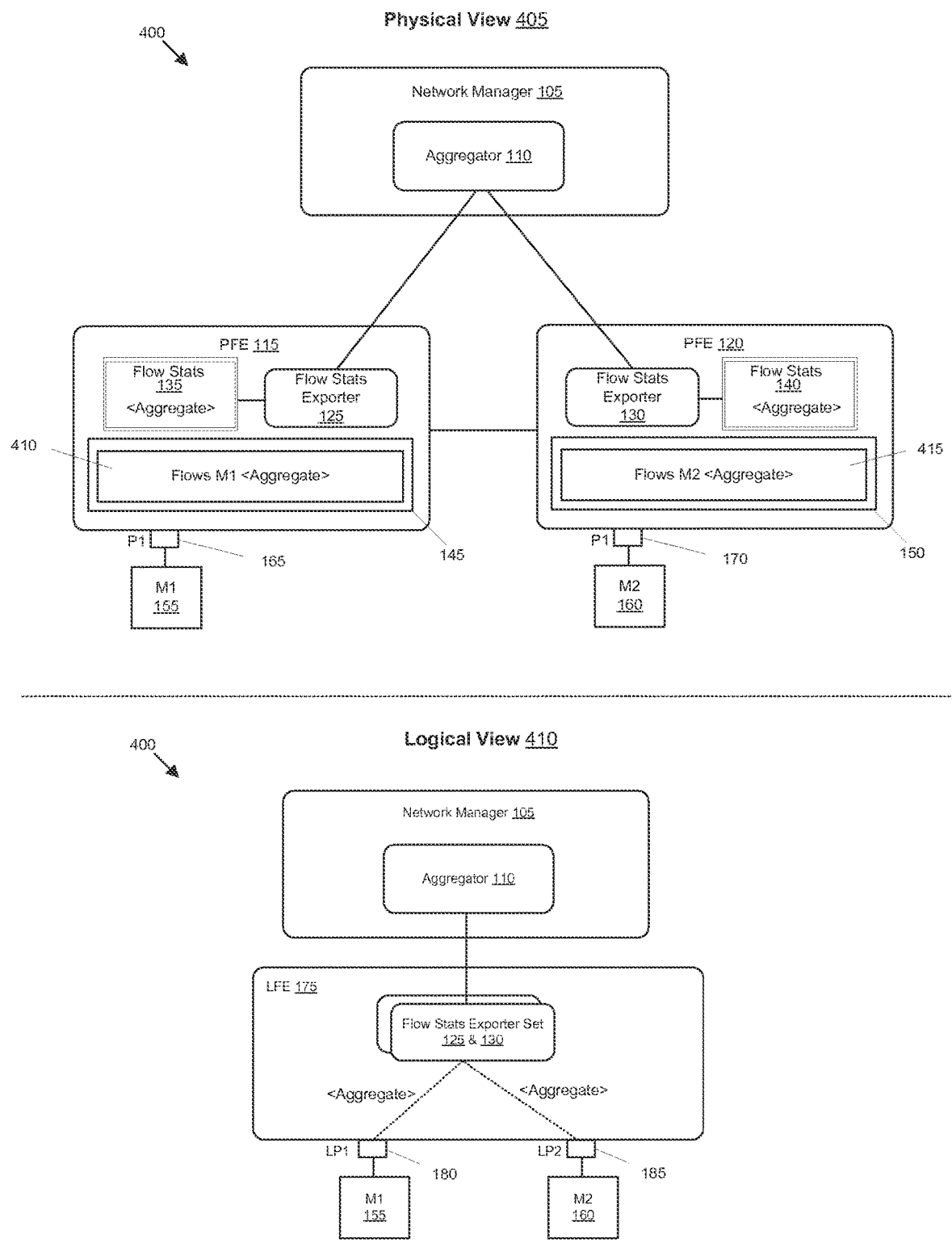
FIG. 4 illustrates a system for aggregating statistics relating to a pair of ports.

FIG. 4 illustrates a system 400 that aggregates statistics relating to an aggregated entity. In this figure, the aggregated entity is a pair of logical ports. This figure is similar to FIG. 1. However, the physical view 405 of FIG. 4 shows that the flows 410 and 415 of the machines 155 and 0160 are tagged with the same aggregation identifier. The flow stats exporters (125 and 130) send the flow statistics to the aggregator 110. The aggregator 110 performs the aggregation of the statistics to figure out the total statistics associated with the flows 410 and 415.

The logical view 410 of FIG. 4 is also similar to the one shown in FIG. 1. Different from FIG. 1, the flow statistics relate to the logical port pair, which consists of logical ports one and two 180 and 185 of the LFE 175. The dashed arrow and the tag, shown between the flow stats exporter set 125 and 130 and each logical port (180 or 185) indicate that statistics of the port pair are collected indirectly through the flow statistics (135 and 140).

Figure 5:
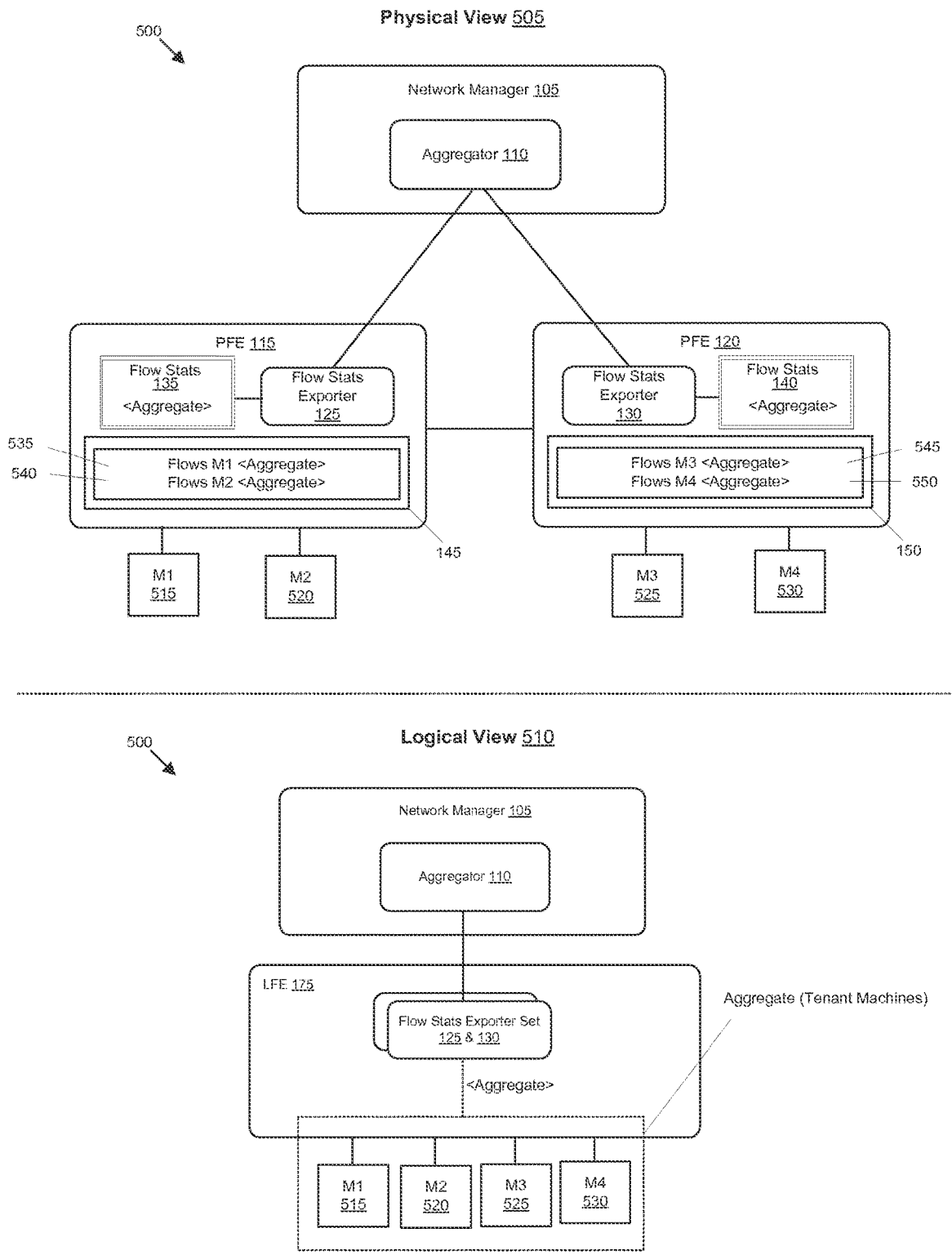
FIG. 5 illustrates a system that aggregates statistics relating to a machine or a group of machines.

In some embodiments, the aggregated entity can be a machine or a group of machines. FIG. 5 illustrates a system 500 that aggregates statistics relating to a machine or a group of machines. The group of machines may be associated with one another because they belong to a same user, tenant, department, or enterprise. This figure is similar to FIG. 1. However, the physical view 505 of FIG. 5 shows that the flows 535-550 of the group of machines 515-530 are all tagged with the same aggregate identifier. The logical view 510 shows that the flow stats exporter set 125 and 130 are indirectly exporting stats for the group of machines 515-530 through the tagged flows 535-550. The aggregator 110 performs the accumulation of the statistics to figure out the total statistics for the group of machines 515-530.

In some embodiments, the aggregated entity can be an access control list (ACL). In some embodiments, the ACL represents a set of rules to permit or deny traffic. The rules can be applied to port number, an address (e.g., IP address, MAC address), protocol, Layer 4 protocol port number, TCP control code, etc. The ACL can include a set of ingress rules and a separate set of egress rule. The ingress ACL is applied by a forwarding element when a packet is received, and the egress ACL is applied when the packet is to be outputted by the forwarding element. For a logical forwarding element, the ingress and egress ACL can potentially be performed by two separate physical forwarding elements (PFEs).

Figure 6:
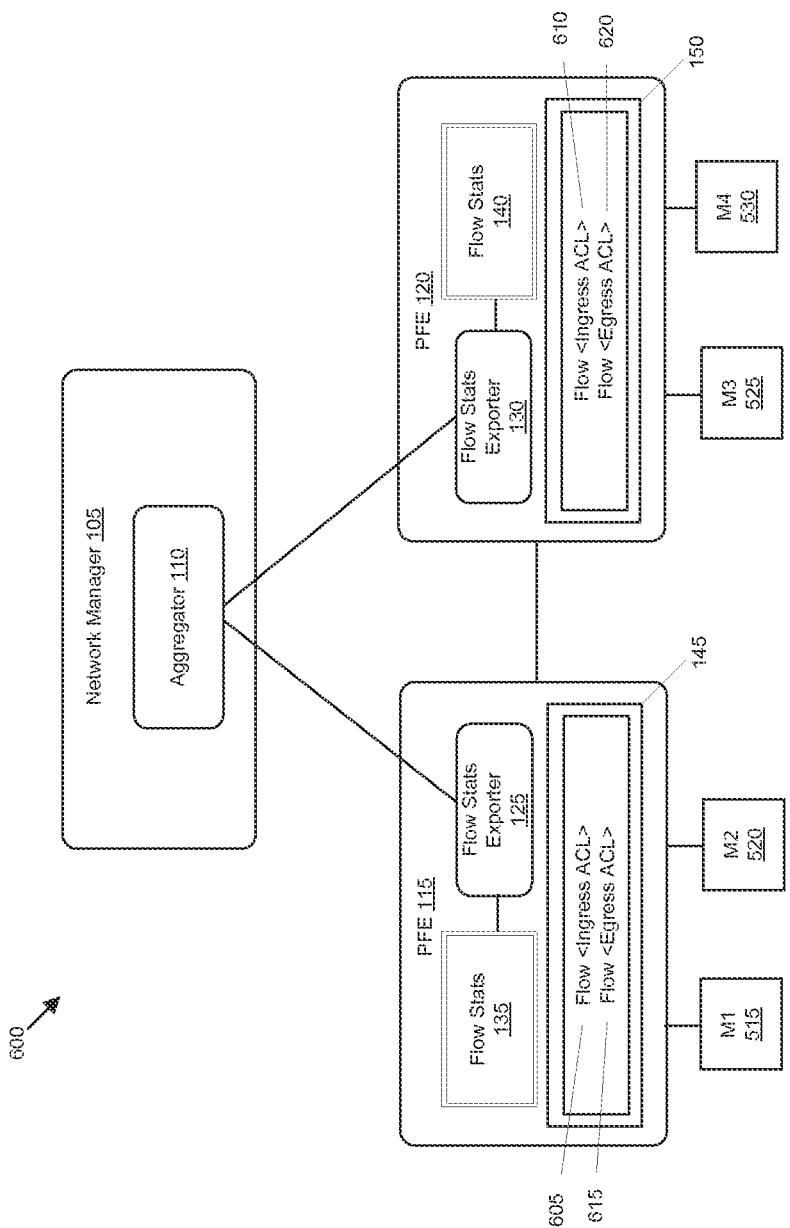
FIG. 6 illustrates a system that aggregates statistics relating to an access control list (ACL).

FIG. 6 illustrates a system 600 that aggregates statistics relating to an ACL. This figure is similar to the physical view of FIG. 1. However, in the example of FIG. 17, the flows 605-620 that represent the ACL are tagged. Specifically, the flows 605 and 610 that represent ingress ACL are tagged with one aggregate identifier, and the flows 615 and 620 that represent egress ACL are tagged with another aggregate identifier.

Many more examples of collecting statistics are described below. In particular, Section I describes an example system that provides a scalable framework to collect statistics. This is followed by Section II that describes several example operation of the system. Section III then describes an example of an electronic system that implement some embodiments described herein.

I. Example System Architecture

Figure 7:
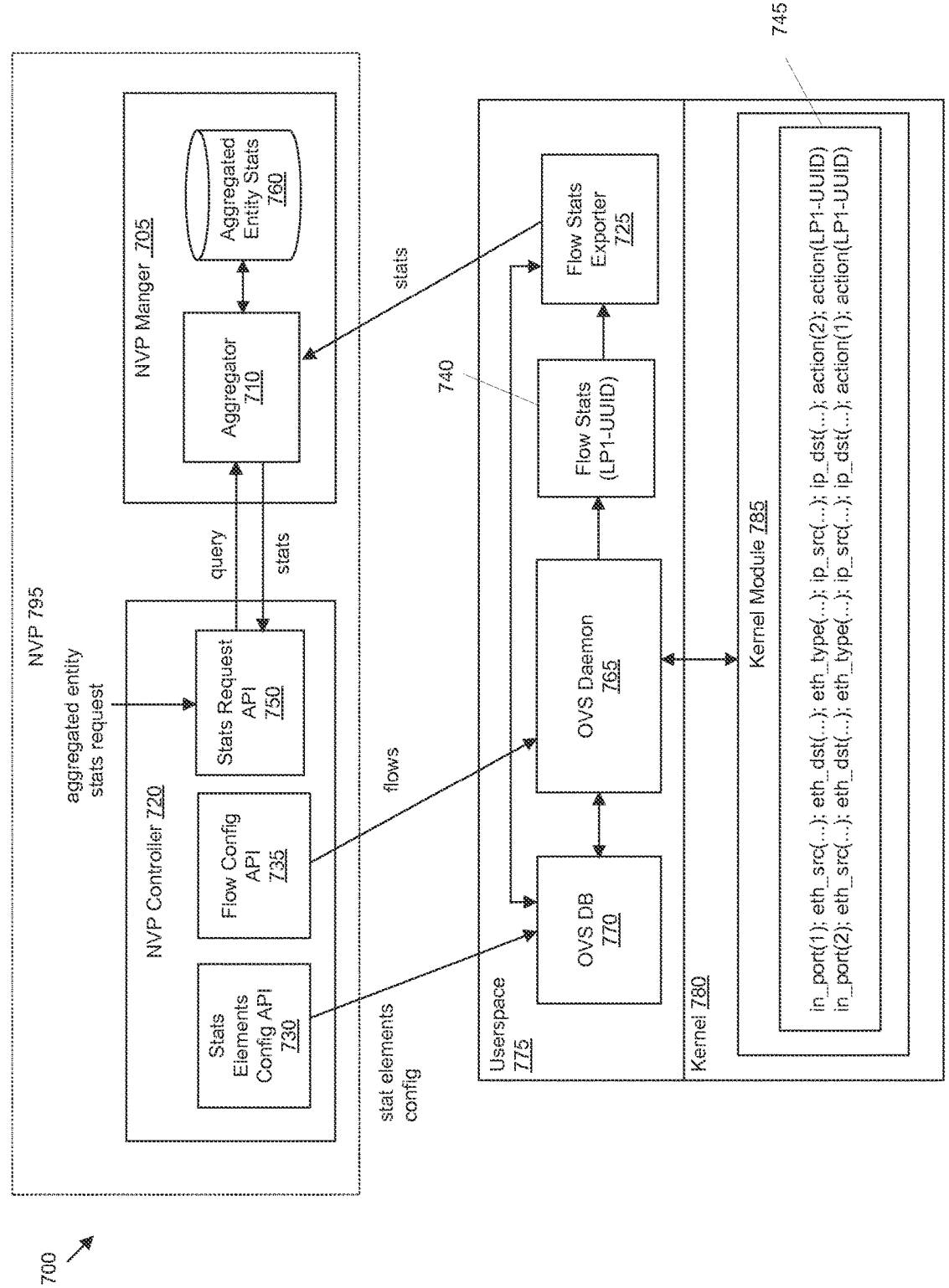
FIG. 7 conceptually illustrates a system with a scalable framework to collect statistics.

In some embodiments, the system provides a scalable framework to collect statistics. FIG. 7 illustrates an example system 700 with such a scalable framework. As shown, the system includes a network virtualization platform (NVP) 795 and a physical forwarding element (PFE) 715. The main components of the framework is the flow stats explorer 725 that operates on the PFE 715 and the aggregator 710 that operates on the NVP 795.

In the example of FIG. 7, the PFE 715 is a software forwarding element, such as an Open Virtual Switch (OVS). In some embodiments, the software forwarding element is implemented on a hypervisor or an operating system that has a kernel 780 and a userspace 775. For instance, the software forwarding element may run on a unique virtual machine that has a modified Linux kernel. In some embodiments, the kernel 780 is the most basic component of an operating system that runs on a separate memory space and is responsible for managing system resources (e.g., communication between hardware and software resources). In contrast, the userspace is a memory space where different user applications can run.

As shown, the userspace 775 of the PFE 715 includes an OVS daemon 765, an OVS database 770, and a flow stats exporter 725. Other daemon processes or applications (not shown) may be included in the userspace 775 as well. The OVS daemon 765 is an application that runs in the background of the userspace 775.

The OVS daemon 765 of some embodiments receives management and configuration information from the NVP controller 720. The OVS daemon 765 may also receive management information from the OVS database (DB) 770. In some embodiments, the management information includes logical forwarding element (LFE) information, bridge information, virtual interface information, tunnel information, etc. To receive management information, the OVS daemon of some embodiments communicates with the NVP controller and the OVS DB using a particular protocol (e.g., OVS DB protocol).

In some embodiments, the configuration information includes flows or instructions that are translated into flows. The OVS daemon 765 of some embodiments receives the flows from the NVP controller through a particular channel (e.g. OpenFlow channel) using a particular protocol (e.g., OpenFlow protocol). In some embodiments, the OVS daemon receives flows that are tagged in some manner to facilitate stats collection. The OVS daemon may also store the flows in a set of one or more flow tables (not shown).

The flow stats exporter 725 of some embodiments reads flow statistics from a storage (e.g., memory 740) and exports flow statistics to an aggregator 710. In some embodiments, the flow stats exporter 725 is also a daemon process that runs in the userspace 775 of the PFE 715. In some embodiments, the flow stats exporter 725 retrieves the statistics from memory using OpenFlow protocol. The flow stats exporter 725 may communicate with the OVS daemon 765 using the OpenFlow protocol to retrieve the statistics.

In some embodiments, the flow stats exporter 725 only export flow statistics that are associated with a tag. The flow stats exporter can export all the different flow statistics that are associated with different tags. In some embodiments, the flow stats exporter can be configured to look for certain tags and output only those stats that are associated with the tags. In some embodiments, the flow stats exporter can be configured to export the stats in set time interval. In some embodiments, the time interval is associated with one tag. This means the flow stats exporter will only export each flow stat associated with that one tag each time the time interval expires. Alternatively, the flow stats exporter can dump all the different flow statistics that are associated with different tags each time the time interval expires. In some embodiments, the flow stats exporter exports the stats in a particular format.

The flow stats exporter 725 of some embodiments receives its configuration information from the OVS DB 770. This is shown in FIG. 7 with the arrow between the flow stats exporter 725 and the OVS DB 770. The flow stats exporter 725 may use a particular protocol (e.g., the OVS DB protocol) to receive the configuration information. In some embodiments, the flow stats exporter reads the configuration information from the OVS DB in set time interval. Alternatively, the flow stats exporter may be registered with the OVS DB server to receive an update each time there is a change to the configuration information in the OVS DB.

As shown in FIG. 7, the kernel 780 includes a kernel module 785 and a datapath cache 745. The kernel module 785 operates on the kernel 780 to process incoming packet. When a packet is received, the kernel module of some embodiments performs a packet classification operation to identify a matching flow in the datapath cache. If there is a matching flow, the kernel module of some embodiments performs the matching flow's associated action on the packet. However, if there is no matching flow, the packet processing is shifted from the kernel 780 to the userspace 775.

When there is a miss in the datapath cache 745, the OVS daemon 765 of some embodiments receives the packet and consults one or more flow tables (not shown) to generate a flow to install in the datapath cache. In some embodiments, the generated flow is based on one or more flows from the NVP controller 720. The generated flow can have the same match field values and a set of one or more actions as a corresponding flow in a flow table. The generated flow can have the same set of actions as that corresponding flow, such as a note action with a tag that identifies an aggregate entity. However, different from the flow from the flow table, the generated flow may not have a priority value and/or may include one or more fields that are wildcarded, or at least partially wildcarded, in some embodiments.

Upon generating the flow, the OVS daemon 765 then sends the packet back to the kernel module 785 with instructions on how to process (e.g., forward or drop) the packet. The OVS daemon also sends to the kernel module the generated flow. The generated flow is then stored in the datapath cache 745 to quickly process other packets having the same set of header values. Accordingly, the datapath cache 745 provides a fast path to process incoming packets. This is because it does not involve flow generation or translation that can occur in the userspace. However, the switching decisions are ultimately made at the userspace 775 with the OVS daemon 765 generating flows to push into the datapath cache 745.

The NVP 795 of some embodiments is used to manage and configure PFEs. These PFEs can be software or hardware forwarding elements, in some embodiments. For instance, the NVP of some embodiments communicates with both software and hardware forwarding elements to define logical forwarding elements. In the example of FIG. 7, the NVP 795 includes a NVP controller 720 and a NVP manager 705.

In some embodiments, the NVP controller 720 is programmed to manage and configure the PFEs (e.g., the PFE 715). The NVP controller may perform the management by sending (e.g., pushing) to the PFEs bridge information, LFE information, virtual interface information, tunnel information, etc. The NVP controller of some embodiments performs the configuration by sending (e.g., pushing) flows to the PFEs. Instead of sending flows, the NVP controller 105 of some embodiments pushes forwarding state information that is translated into a set of flows at the PFE. For instance, instead of pushing flows, the NVP controller may exchange forwarding state with a hardware forwarding element.

As shown, the NVP controller 720 includes (1) a stats elements configuration application programming interface (API) 730, (2) a flow configuration API 735, and (3) a stats request API 750. The stats element configuration API 730 is used to configure the flow stats exporter 725. In some embodiments, the stats element configuration API 730 may also be used to configure the aggregator 710. In some embodiments, the stats element configuration API 730 stores configuration information in the OVS DB 770. As mentioned above, the flow stats exporter 725 of some embodiments reads the configuration information from the OVS DB 770 to configure itself. In some embodiments, the NVP controller 720 uses a particular protocol (e.g., OVS DB protocol) to communicate with the OVS DB 770.

The flow configuration API 735 is used to push flows to the OVS daemon 765. The NVP controller 720 of some embodiments pushes flows to the OVS daemon 765 through a particular channel (e.g. OpenFlow channel) using a particular protocol (e.g., OpenFlow protocol). In some embodiments, the OVS daemon receives flows that are tagged in some manner to facilitate stats collection. The OVS daemon may also store the flows in a set of one or more flow tables (not shown).

The stats request API 750 provides an interface to retrieve statistics from the storage 760. In some embodiments, the stats are retrieved from the storage 760 through the aggregator 710. For instance, in the example of FIG. 7, a network administrator's aggregated entity stats request is initially received at the stats request API. The stats request API then make a query to the aggregator based on the stats request. The aggregator retrieves the requested stats from the storage 760. The aggregator then returns the stats to the stats request API. The stats request API then provides the retrieved stats to the network administrator. In some embodiments, the user interface with the statistical data is provided by the NVP manager 705.

Different from the NVP controller 720, the NVP manager 705 of some embodiments provides a user interface to access various services that the NVP controller provides. The NVP manager can also include logic that is not included in the NVP controller. In the example of FIG. 7, the NVP manager of some embodiments includes the stats aggregation logic with the aggregator 710.

The aggregator 710 of some embodiments is a component of the system 700 that (1) receives statistics from one or more flow stats exporters, and (2) stores the statistics in the storage 760. The storage is a database, in some embodiments. Rather than simply storing the statistics, the aggregator accumulates or aggregates the statistic. This means that that for a given entity or a given aggregated entity, the aggregator initially stores the statistics and then updates the statistics with each stats report from a flow stats exporter. As an example, when the initial report has a value x for the packet count and a subsequent report has a value y, the aggregator may update the initial statistics by adding the delta or difference between those two values.

In some embodiments, the aggregator 710 is also used to retrieve statistics from the storage 760. For instance, when there is a request for statistic relating to a logical port or an aggregated entity, the aggregator in some such embodiments queries to the storage to retrieve the requested statistics. Alternatively, the system of some embodiments separates the statistics aggregation from the statistics retrieval. In other words, the system can include separate components that perform the aggregation and the retrieval.

One of ordinary skill in the art would understand that the system architecture is an example architecture and that different embodiments can include different sets of components. The naming of the various components is arbitrary and can change from one implementation to another. While many of the features of the system 700 have been described as being performed by one component or module (e.g., the aggregator, the flow stats exporter), one of ordinary skill in the art will recognize that the functions of such components and other components described herein might be split up into multiple sub-components. Similarly, functions described as being performed by multiple different components might be performed by a single component, in some embodiments.

II. Example Operations

The preceding section descried a system that includes a scalable framework to collect statistics. Several example operations of the system will now be described below by reference to FIGS. 8-18.

A. Configuration

Figure 8:
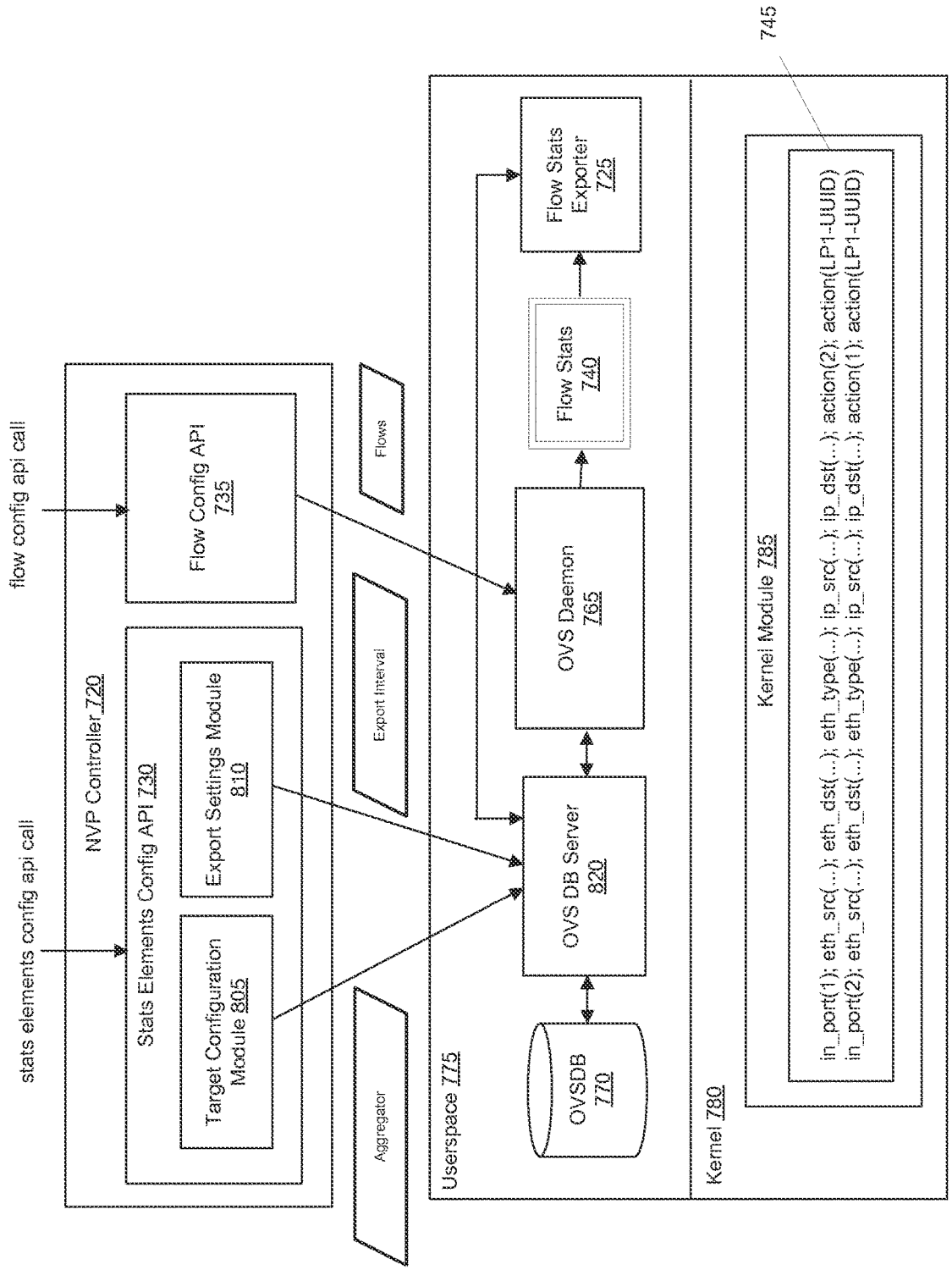
FIG. 8 shows a data flow diagram that illustrates an example of configuring a transport node to export stats to an aggregator.

FIG. 8 shows a data flow diagram that illustrates an example of configuring a transport node to export stats to an aggregator. The figure includes the NVP controller 720 and the PFE 715 that are described above by reference to FIG. 7. In the example of FIG. 8, the transport node is the PFE 715.

As shown in FIG. 8, the NVP controller 720 of some embodiments sends various pieces of configuration data to the PFE 715. The data flow for configuring the flow stats exporter 725 begins when a network administer uses the stats element configuration API 730 to input configuration data. The configuration data is then sent by the stats element configuration API 730 to the OVS DB server 770. In some embodiments, the configuration data includes aggregator data. The aggregator data specifies that the flow stats exporter 725 report to a particular aggregator. The aggregator data may include an address (IP address) and/or a name or identifier associated with the particular aggregator. In some embodiments, the configuration data includes export interval. In some embodiments, the configuration data includes one or more tags. In the example of FIG. 8, the stats element configuration API 730 includes a target configuration module 805 to send the aggregator data and an export settings module 810 to send the export interval.

The data flow for pushing flows to the PFE 715 begins when a network administrator uses the flow configuration API 735 to input flows. For the purpose of stats collection, the user may input instructions to tag certain flows. The flow config API then sends each flow to the PFE. The OVS daemon 765 of the PFE 715 receives each flow and stores the flow in a flow table (not shown). If the kernel module 780 cannot process a packet, the flow or a modified version of the flow may be installed in the datapath cache 745.

Figure 9:
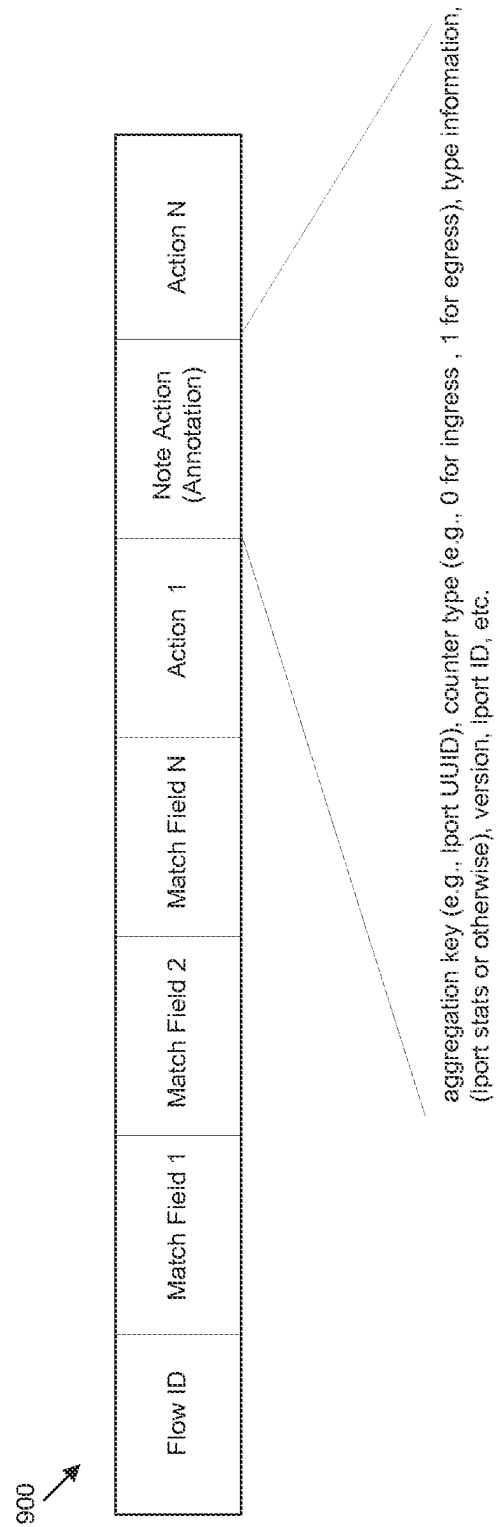
FIG. 9 illustrates an example of a flow entry that is associated with metadata to facilitate stats collection.

FIG. 9 illustrates an example of a flow entry 900 that is associated with metadata to facilitate stats collection. As shown, the flow entry 900 includes a flow identifier to identify the flow. The flow entry 900 can include one or more match fields. The flow entry can include one or more actions. If the flow entry is to be used for stats collection, then the flow entry should be associated with at least one piece of metadata.

In the example of FIG. 9, the metadata is associated the flow using a special type of action called a note action. This note action feature has existed in previous versions of the Open vSwitch (OVS). The note action in the previous versions did nothing at all, except associate the note with the flow. The framework of some embodiments incorporates this existing tagging component to annotate flows. That is, the scalable framework of some embodiments includes this existing tagging component. Instead of leveraging an existing feature, the scalable framework may provide another tagging component to annotate flows.

Each note action can include one or more tags. Examples of such tags includes an aggregator key (e.g., logical port UUID), a counter type (e.g., 0 for ingress, 1 for egress), type information (logical port stats or otherwise), a version number, logical port ID. However, the note action can be used to tag a flow in any manner with one or more various tags in order to facilitate the collection of statistics. In some embodiments, the flow can include multiple note actions. If there are multiple note actions, the flow stats exporter may export the same stat multiple times. Of course, this depends on how the flow stats exporter is implemented.

In some embodiments, any number of bytes represented as hex digits (e.g., hh) may be included in the note action. Pairs of hex digits may be separated by periods for readability. In some embodiments, the note action's format does not include an exact length for its payload, so the provided bytes will be padded on the right by enough bytes with value zero to make the total number six more than a multiple of eight.

Figure 10:
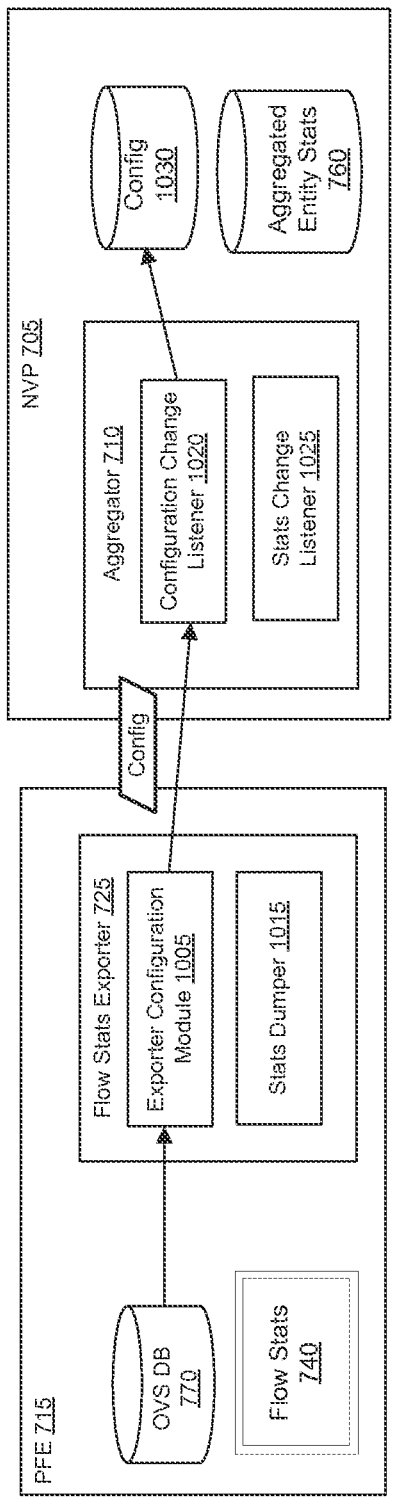
FIG. 10 provides an illustrative example of the flow stats exporter receiving configuration data from the storage and then sending it to the aggregator.

In some embodiments, the flow stats exporter receives configuration from the storage and propagates the configuration to an aggregator. FIG. 10 provides an illustrative example of the flow stats exporter receiving configuration data from the storage and then sending it to the aggregator.

As shown in FIG. 10, the flow stats exporter 725 of some embodiments includes an exporter configuration module 1005 to read configuration data from the storage 770 (e.g., in a periodic basis) and to configure the exporter. The configuration module 1005 may also send one or more pieces of configuration data to the aggregator 710. The flow stats exporter 725 also includes a stats dumper 1015 that reads flow stats from memory (e.g., in a periodic basis) and send the flow stats to the aggregator 710. In some embodiments, flow stats exporter has two communication channels to each aggregator, one for configuration and another for stats. However, these channels might be multiplexed onto the same port by just encoding the messages. Also, it is not entirely necessary for them to be on two separate ports. In some embodiments, if more than one aggregator is configured, the flow stats exporter will bucket the aggregators and hash one or more values (e.g., the annotated aggregation key) to determine which aggregator to send the statistics to. The hash will be consistent across each of the flow stats exporter, in some embodiments.

In some embodiments, the configuration data may include a table to configure "logical sFlow agents". This configuration may include (but is not limited to): rate of export, sFlow collector endpoints (IP, port). Normally, physical forwarding elements run their own sFlow agents and are configured via the command line with the rate of export and sFlow collector endpoints. The idea is that the aggregators may simulate a virtual sFlow agent per logical forwarding element, and export sFlow formatted sampling data to the configured sFlow collector endpoints. By doing so, an administrator can leverage a normal sFlow collector to collect statistics from a logical forwarding element, which does not exist in reality. To implement this correctly, the note action of some embodiments used to tag the flow must also include the logical forwarding element identifier and the port index (port number) of the logical port. Note that the port index is necessary because the sFlow format does not support UUIDs to identify the ports on a switch. The reason is because physical switches normally have a fixed number of ports (<255 generally), so the ports are identified via an index.

In some embodiments, the stats that the aggregator export via sFlow will be ifin/OutOctets and In/OutunicastPkts. The unicastPkts includes the total multicast, broadcast, and unicast packet counts. For the source sFlow agent ipv6 address, the framework of some embodiments uses the logical switch's UUID. For the interface ID, the framework of some embodiments uses the logical port ID. In some embodiment, the stats updates and stats exports occur asynchronously. So, regardless of how fast the aggregator receive updates, the aggregator of some embodiments only pushes updates according to its own internal timer per configured logical switch.

B. Updating Statistics

Figure 11:
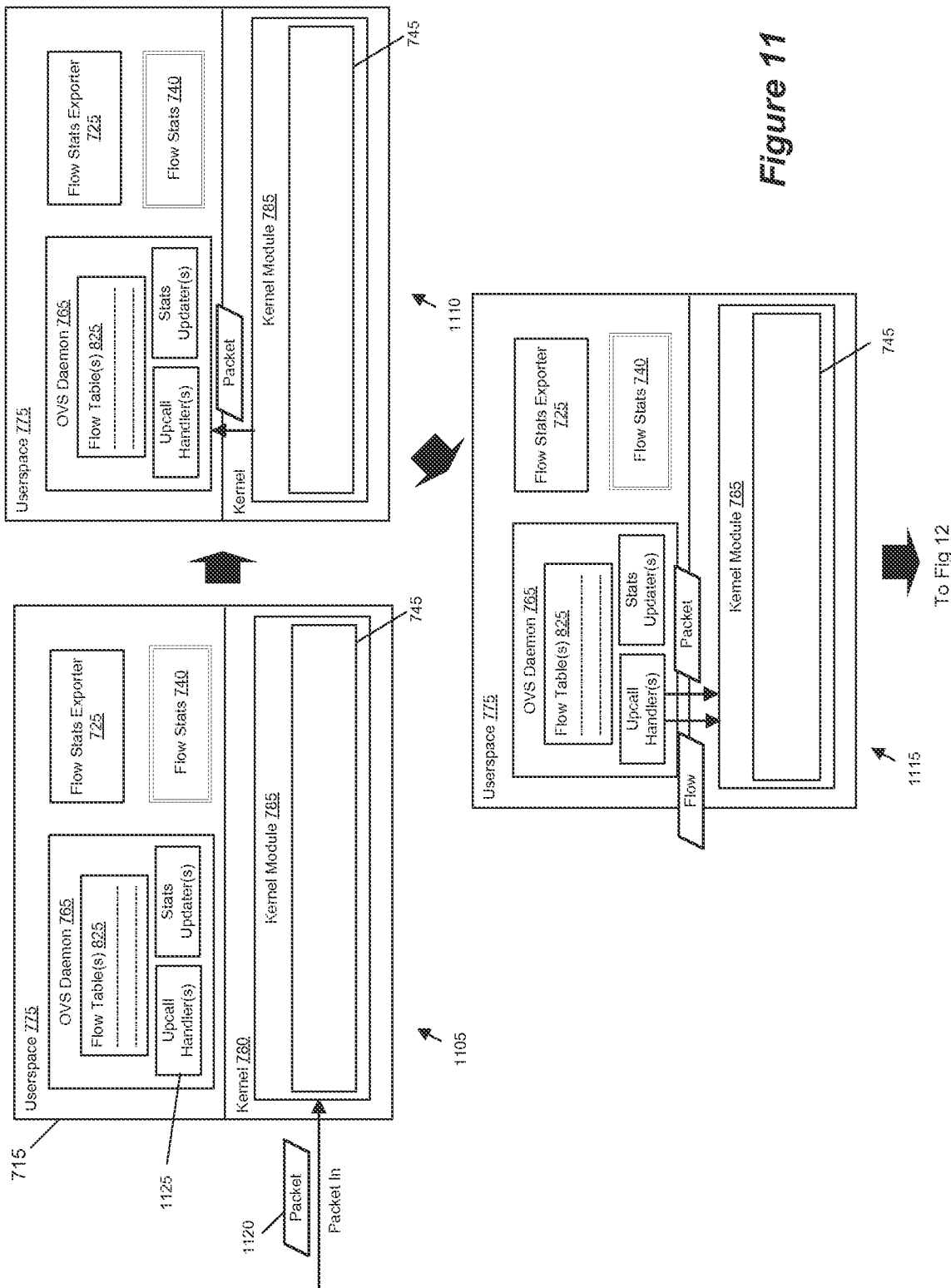
FIG. 11 illustrates an example of a physical forwarding element installing a flow in a cache to forward packets.
Figure 12:
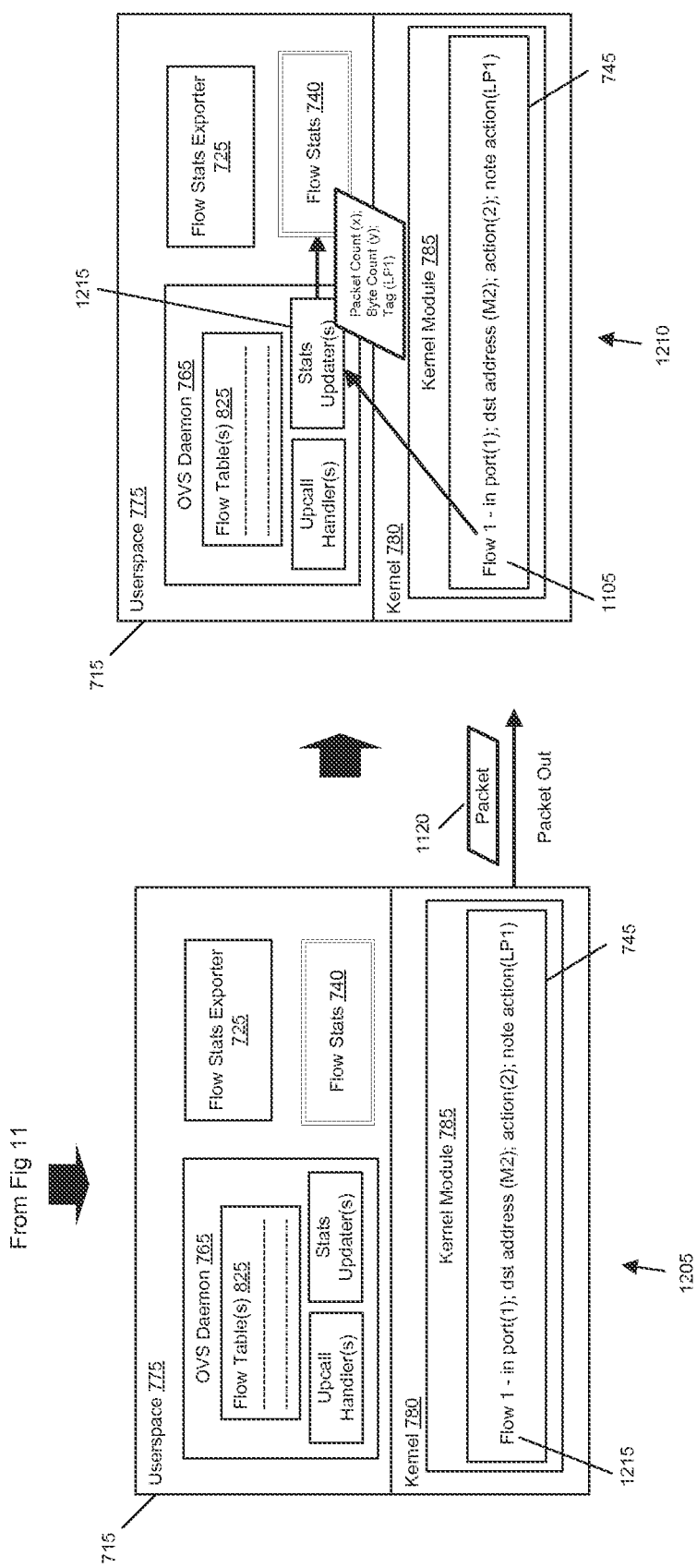
FIG. 12 illustrates an example of the physical forwarding element forwarding a packet and updating statistics associated with the flow.

Several examples of updating statistics will now be described by reference to FIGS. 11 and 12. FIGS. 11 and 12 illustrate an example of how the physical forwarding element (PFE) of some embodiment process a packet using a flow annotated with a marking and update the statistics associated with the flow. Specifically, FIG. 11 illustrates an example of a PFE installing a flow in a cache to forward packets. This is followed by FIG. 12, which illustrates an example of the PFE forwarding a packet and updating statistics associated with the flow. These figures illustrate the PFE 715 that is described above by reference to FIG. 7.

Three operational stages 1105-1115 of the PFE 715 are shown in FIG. 11. The first stage 1105 shows the PFE 715 receiving a packet 1120. The packet is received by the kernel module 785 of the PFE 715. After receiving the packet, the kernel module 785 of some embodiments performs a packet classification to identify a matching flow from the datapath cache 745. As no matching flow is found in the datapath cache 745, the control is shifted from the kernel space 780 to the userspace 775. This is shown in the second stage 1110 with the packet being sent from the kernel module 780 to the OVS daemon 765.

In the second stage 1110, the OVS daemon 765 calls upon an upcall handler 1125 to generate a flow to install in the datapath cache 745. In some embodiments, the upcall handler operates in a separate thread to generate the flow. There can also be a number of upcall handlers that operates in separate threads to generate flows. In some embodiments, the upcall handler performs a packet classification to identify a matching flow from one or more flow tables 825. In some embodiments, the generated flow is based on the matching flow identified by the upcall handler.

The third stage 1115 illustrates the PFE 715 after the upcall handler 1125 has generated a flow to install in the datapath cache 745. Here, the upcall handler sends the packet back to the kernel module 785 with instructions on how to process (e.g., forward or drop) the packet. The upcall handler also sends to the kernel module the generated flow. The generated flow is then stored in the datapath cache to quickly process other packets having the same set of header values.

Two operational stages 1205 and 12110 of the PFE 715 are shown in FIG. 12. These stages 1205 and 1210 are a continuation of the ones shown in the previous figure. The first stage 1205 shows that the generated flow 1215 has been installed in the datapath cache 745. The flow includes a set of match fields, an action to perform on the packet, and a note action. The note action is used to facilitate stats collection. In the first stage 1205, the kernel module 785 also forwards the packet 1120 by sending it out a particular output port (e.g. port two).

The second stage 1210 shows the PFE 715 updating statistics associated with the flow 1105. In the second stage 1210, the OVS daemon 765 calls upon a stats updater 1215 to update the statistics associated with the flow. In some embodiments, the stats updater operates in a separate thread to update statistics associated with the flow. The stats updater of some embodiments reads various counters (e.g., in memory of the kernel space 780) to store the stats (e.g., in memory 745 of the userspace 775).

In some embodiments, the PFE 715 includes a revalidator that revalidates each flow in the datapath cache while updating the flow's stats. The revalidation is important because, in some case, the PFE is constantly receiving new flows and deleting exiting flows in the flow table(s) 825. In some embodiments, the revalidation entails performing a classification operation the flow's match field values using the flow table(s) 825 and determining if the set of one or more actions remain the same. If the set of actions are different, the flow is removed from the datapath cache 745.

In some embodiments, the PFE 715 includes a flow dumper that performs a flow eviction process while updating the flow's stats. The flow eviction process of some embodiments determines if a flow in the datapath has expired and, if so, removes the flow from the datapath cache 745. For instance, if the flow has been in the cache for a set period of time or has not been used for a set period of time, the PFE 715 may delete the flow from the datapath cache 745. In some embodiments, the PFE 715 makes the decision about how long a flow stays in the datapath cache 745 based on how recently it was used and/or the amount of flows in the cache.

D. Exporting Statistics

Figure 13:
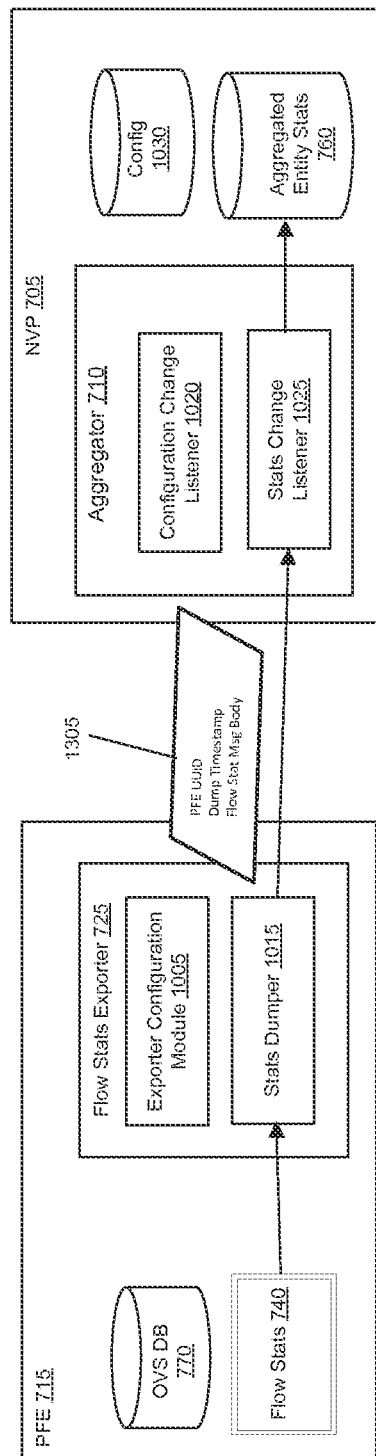
FIG. 13 illustrates an example of the flow stats exporter sending a report with the flow stats.

As mentioned above, the flow stats exporter of some embodiments exports flow stats to the aggregator in a periodic basis. FIG. 13 illustrates an example of the flow stats exporter sending a report with the flow stats.

As shown in FIG. 13, the flow stats exporter 725 of some embodiments includes the stats dumper 1015 that reads flow stats from memory 740 and sends a report with the flow stats to the aggregator 710. In some embodiments, the flow stats exporter dumps flow statistics in set timed interval. For instance, the flow stats exporter may read and send flow statistic to the aggregator each second, some millisecond, or some other set time period. In some embodiments, the flow stats exporter can be configured to export at a specified time interval. Alternatively, the flow stats exporter of some embodiments is hard-coded with a time interval (e.g., a default time interval).

As shown in FIG. 13, the aggregator 710 of some embodiments includes a stats change listener 1025 to listens for each stats report. After receiving the report, the aggregator of some embodiments may store the stats in the report or use the stats in the report to update previously stored stats. For instance, when the initial report has a value x for the byte count and a subsequent report has a value y, the aggregator may update the initial statistics by adding the delta or difference (y-x) between those two values.

In some embodiments, the report 1305 can include one or more stats for one aggregated entity. Alternatively, the report can include multiple stats for different aggregated entity. In some embodiments, the report includes a timestamp that represents dump time. In some embodiments, the dump time is used to calculate a start time for a flow. The start time can be calculated by subtracting the duration of the flow from the dump time. As will be described below by reference to FIG. 18, the start time is used to detect discontinuity in the current stats report. In some embodiments, the report can include one or more of the following: a UUID of the PFE, a dump timestamp, a hash (e.g., a hash of flow match, aggregation key, and/or counter type), a flow identifier (ID), an aggregation key (e.g., logical port UUID, port-pair UUID), hypervisor to hypervisor tunnel UUID, duration, number of bytes sent, number of packets sent, and counter type.

E. Example Operations of the Flow Stats Exporter

Figure 14:
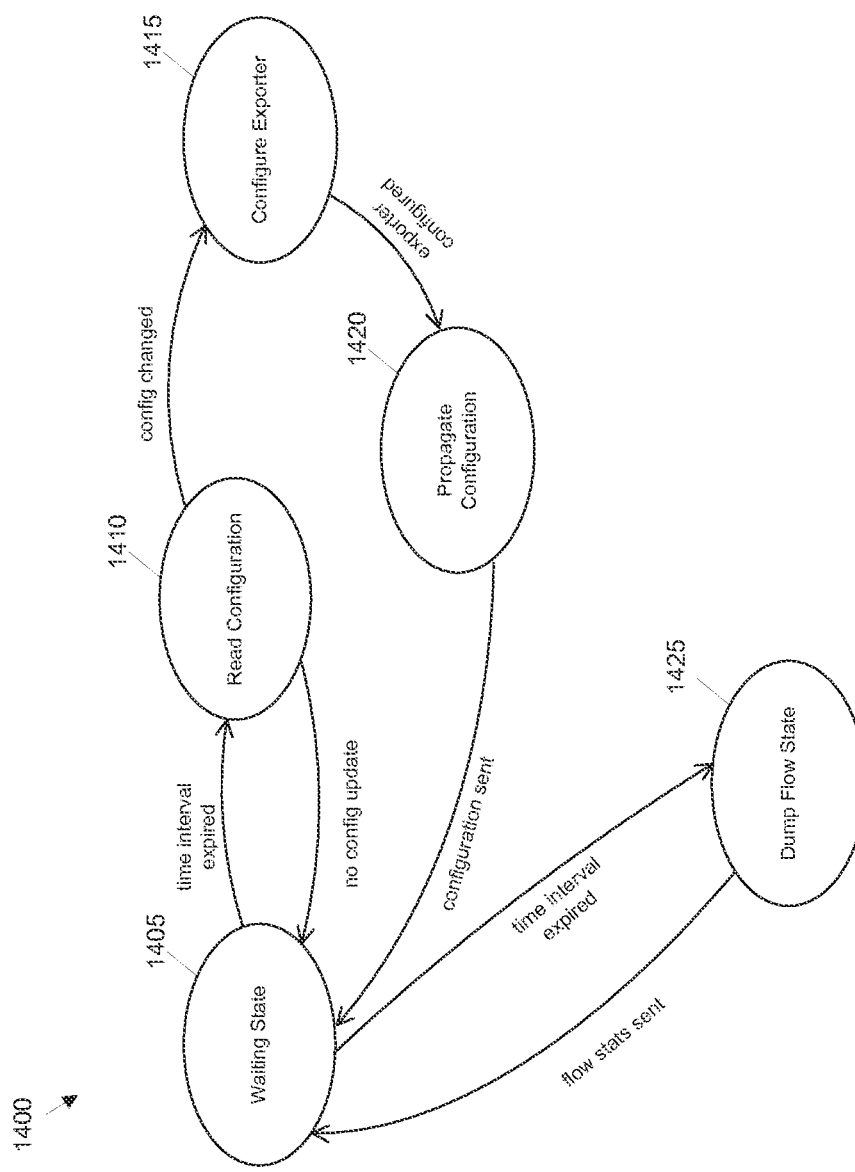
FIG. 14 presents a state diagram that illustrates example operations performed by a flow stats exporter.

In some embodiments, a flow stats exporter is implemented on each physical forwarding element (PFE) that participates in the accumulation of the statistics. FIG. 14 presents a state diagram 1400 that illustrates example operations performed by such a flow stats exporter. This figure shows several states 1405-1425 that collectively perform these operations. Each of the states represents a set of one or more processes for performing a subset of the operations. The states include a waiting state 1405, a read configuration state 1410, a configure exporter state 1415, a propagate configuration state 1420, and a dump flow state 1425. Not all operations have to be performed by the flow stats exporter. For instance, the flow stats exporter of some embodiments does not propagate the configuration to an aggregator.

In the waiting state 1405, the flow stats exporter of some embodiments waits for a specified time interval to expire in order to read configuration from a storage (e.g., database). When the time interval has expired, the flow stats exporter transitions to the read configuration state 1410. In the read configuration state, the flow stats exporter reads configuration from the storage. If there is no configuration update, the flow stats exporter returns to the waiting state 1405.

If the configuration has changed, the flow stats exporter enters the configure exporter state 1415. In this state, the flow stats exporter configures itself according to the configuration data from the storage. In some embodiments, the configuration can include one or more of the following: configuring a time interval to dump flow stats, configuring the flow stats exporter to send flow stats to a particular aggregator, configuring the flow stats exporter to export flow stats of each flow that is associated with a particular tag, and configuring the flow stats exporter to stop exporting the flow stats of each flow that is associated with the particular tag. In some embodiments, the flow stats exporter can be configured to reset statistics (e.g., by replacing the aggregated statistics value with a zero value).

In some embodiments, if the configuration has changed, the flow stats exporter also enters the propagate configuration state 1420. In this state, the flow stats exporter sends one or more pieces of the configuration data to the aggregator. An example of propagating configuration is described above by reference to FIG. 10.

Once the configuration has been propagated, the flow stats exporter returns to the waiting state 1405. As mentioned above, the flow stats exporter of some embodiments does not wait for a set time interval to read configuration data from the storage. The flow stats exporter may be registered with a database server to receive an update each time there is a change to the configuration information in the database.

In the waiting state 1405, the flow stats exporter of some embodiments waits for a specified time interval to expire in order to read flow stats from a storage (e.g., memory). When the time interval has expired, the flow stats exporter transitions to the dump flow state 1425. In this state, the flow stats exporter reads flow stats from storage, generates a report, and sends the report to the aggregator. The message may include the current stats associated with each flow that is tagged with a particular tag. The message may also include a dump time that is used to calculate a start time of each flow. Several example of dumping flow stats have been described above by reference to FIG. 13.

F. Example Operations of the Aggregator

As mentioned above, the system of some embodiments includes an aggregator. The aggregator of some embodiments is a component of the system that receives statistics from one or more flow stats exporters, and stores the statistics in a storage. Rather than simply storing the statistics, the aggregator accumulates or aggregates the statistic. This means that for a given entity or a given aggregated entity, the aggregator initially stores the statistics and then updates the statistics with each stats report from a flow stats exporter.

Figure 15:
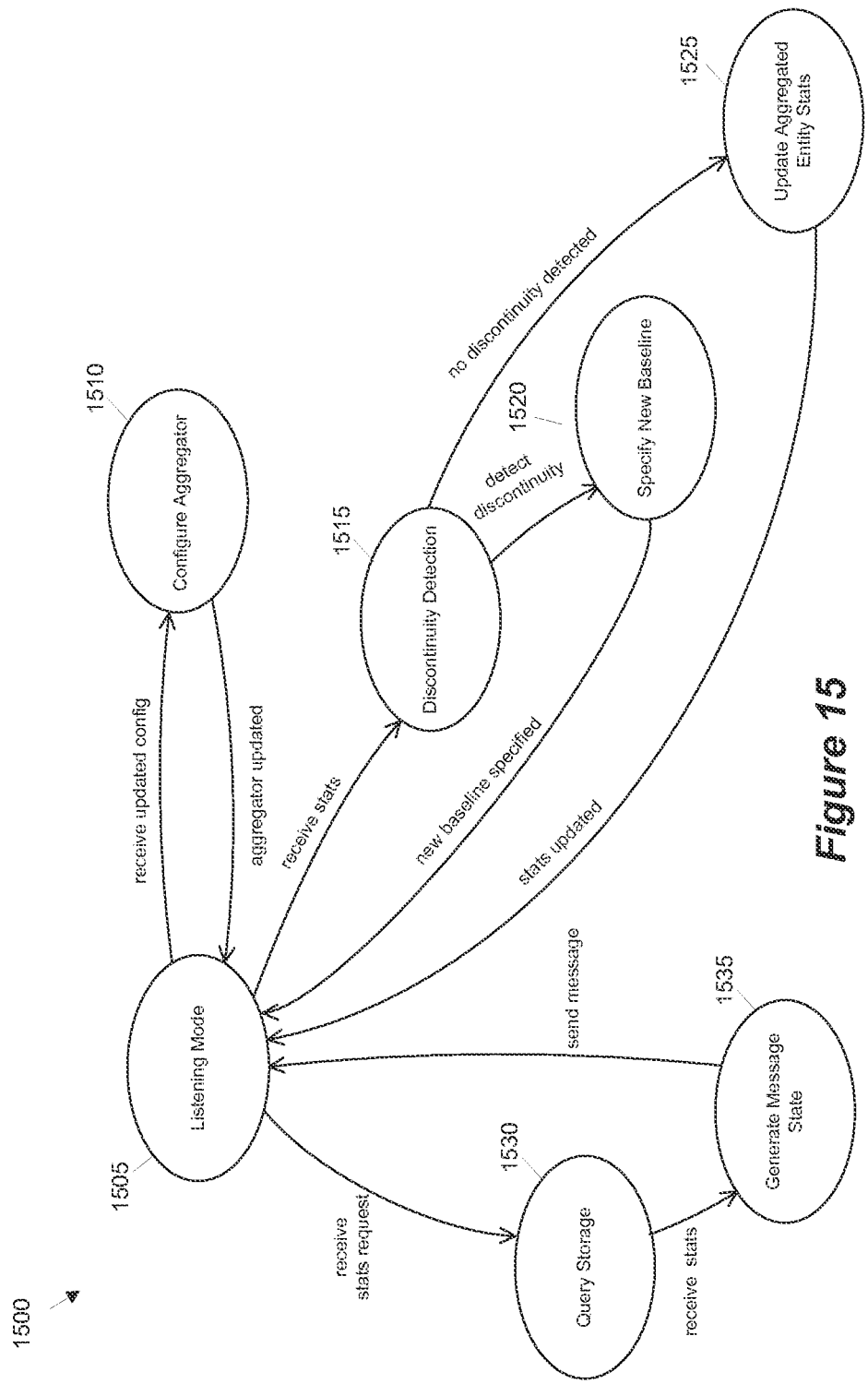
FIG. 15 presents a state diagram that illustrates example operations performed by an aggregator.

FIG. 15 presents a state diagram 1500 that illustrates example operations performed by the aggregator. This figure shows several states 1505-1530 that collectively perform these operations. Each of the states represents a set of one or more processes for performing a subset of the operations. The states include a listening mode state 1505, a configure aggregator state 1510, a discontinuity detection state 1515, specify new baseline state 1520, a update stats state 1525, a query storage state 1530, and a generate message state 1535. Not all operations have to be performed by the aggregator. For instance, the aggregator of some embodiments does not perform one or more of the operations, such as the configuration state 1510. Furthermore, several of the states may be performed by different components. For instance, the system of some embodiments includes a collector component that performs the query storage state 1530 and the generate message state 1535.

In the listening mode state 1505, the aggregator of some embodiments listens for messages from one or more flow stats exporters. As mentioned above, each flow stats exporter operating on a particular physical forwarding element (PFE) might send a report to the aggregator in a periodic basis.

If a message with stats has been received, the aggregator transitions to the discontinuity detection state 1515. At this state 1515, the aggregator detects whether there is a discontinuity in the received stats. In some embodiments, a discontinuity can occur when a stats counter went backwards, when duration associated with a sub-element or flow is less than a previously stored duration, or when the start time of the flow is off by more than a threshold period of time. In some embodiments, the discontinuity detection is performed so that aggregator does not calculate the delta between current discontinues flow and the previous flow. Meaning, if there is discontinuity, there is no real delta that the aggregator can add to the aggregate entity's counter(s).

In some embodiments, when there is no discontinuity detected, the aggregator transition to the update stats state 1525. At this update stats state 1525, the aggregator may calculate the difference between the previously stored stats and the received stats, and add the difference to aggregated stats. In some embodiments, the aggregator might store the received stats, along with its metadata (e.g., duration) in order to detect discontinuity in the next stats received from the same flow stats exporter. After updating the stats, the aggregator returns to the listening mode state 1505, in some embodiments.

In some embodiments, when there is discontinuity, the aggregator transition to the specify new baseline state 1520. At this state, the aggregator of some embodiments ignores the statistics that are discontinuous, and uses the statistics as a new baseline or as the last seen statistics. After specifying the new baseline, the aggregator of some embodiments returns to the listening mode state 1505.

In the listening mode state 1505, the aggregator of some embodiments listens for stats request messages. When a stats request message is receive, the aggregator transitions to the query storage state 1530. At this state 1530, the aggregator generates a query and queries the storage with the aggregated stats. The query may be generated using one or more tags (e.g., aggregation key) derived from the stats request message.

When the query results in the requested stats being retrieved from the storage, the aggregator transitions to the generate message state 1535. At this state, the aggregator generates a response message with the retrieved stats. If the query returns no stats, the aggregator may still transition to the generate message state. However, the message will not include the requested stats and/or include a note specifying that there are no stats results. In some embodiments, a stats request may include a request for statistics of a number of entities (e.g., aggregated entities). If the stats for one or more entities do not exist in the storage, the aggregator of some embodiments simply just responds by omitting the statistics of each entity that does not exist in the storage.

In the listening mode state 1505, the aggregator of some embodiments listens for configuration from a flow stats exporter. For example, a new flow stats exporter may be registered with the system to track entity statistics. When such a configuration message is received, the aggregator transitions to the configure aggregator state 1510. At this state, the aggregator may configure itself to listen for stats from the new flow stats exporter.

G. Discontinuity Detection

In some cases, there can be discontinuity between a current report and the aggregated stats. For instance, a stats counter may have went backwards. This can occur if a flow in a flow table or a cache has expired due to inactivity. If the same flow is reinstalled in the flow table or the cache, the stats of the flow are reset, and the report from the flow stats exporter will reflect that reset. To deal with such discontinuity, the aggregator of some embodiments stores not only the aggregated statistics but also the last seen statistics. In some embodiments, the last seen statistics is used to calculate the delta that is added to the aggregated statistics. In some embodiments, when there is discontinuity with the stats report, the aggregator ignores the statistics that are discontinuous, and uses the statistics as a new baseline or as the last seen statistics.

In some embodiments, the aggregator retrieves the duration associated with a flow to detect discontinuity. For instance, if the duration in the current report is less that the duration from the previous report, the aggregator determines that there is discontinuity in the current stats report. Thereafter, the aggregator may ignore the statistics that are discontinuous, and use the statistics as a new baseline or as the last seen statistics.

The aggregator of some embodiments may also determine that the stats are discontinuous by calculating a start time for a given flow. The start time can be calculated by subtracting the duration from the dump time. The start time can be calculated for each report and compared. If the start time is off by more than a specified time period, the aggregator of some embodiments specifies that there is discontinuity in the current stats report. Here, the aggregator may also ignore the statistics in the current report, and use the statistics as a new baseline or as the last seen statistics.

FIGS. 16 and 17 conceptually illustrate an example of how the aggregator some embodiment aggregates statistics. These figures show two tables, namely an aggregated statistics table 1615 and a last seen flow statistics table 1620. In the example, the aggregated statistics table 1615 includes table columns for (1) an aggregated entity identifier or key, (2) a counter index for identifying whether the aggregated entity (e.g., the logical port) is associated with an inbound data flow (e.g., to a machine) or an outbound data flow (e.g., from the machine), (3) the aggregated byte count, and (4) the aggregated packet count. Also, the last seen flow statistics table includes table columns for a physical forwarding element identifier and a last seen flow statistics set. One of ordinary skill in the art would understand the tables in this example is conceptual. That is, the data can be stored in any different format. The data may not even be stored in different tables.

For brevity's sake, the example of FIGS. 16 and 17 also omits the duration. That is, the example assumes that there are no duration conflicts, only counters going backwards. In some embodiments, in order to keep on calculating deltas, the aggregator always must take the discontinuous flow statistics as the new baseline. They are taken as the new baseline, so that the aggregator can calculate the deltas of the flow statistics continued from the discontinuous flow.

Two stages 1605 and 1610 are shown in FIG. 16. The first stage 1605 shows the initial state prior to receiving any report from a flow stats exporter. In the second stage 1610, two flow statistics relating to a logical port one (lp1) of a logical forwarding element are sent in a report 1625 from the flow stats exporter on a single hypervisor with the PFE to the aggregator. The report 1625 includes a physical forwarding element (PFE) identifier (e.g., the PFE's UUID) and two stats associated with two different flows representing the lp1. Here, the two statistics are associated with the same logical port identifier (e.g., lp1). In addition, each of the two stats is associated with a counter index. This is because the corresponding flow has not only been tagged with the logical port identifier but also a particular counter index. As mentioned above, the system can track both inbound and outbound traffic of ports (e.g., logical ports) by using such a counter index. For instance, the counter index of 0 can be for inbound data and 1 for outbound data.

Two stages 1705 and 1710 are shown in FIG. 17. These stages 1705 and 1710 are a continuation of the ones shown in the previous figure. In the first stage 1705, two flow statistics relating to lp1 are sent again after some time period in another report 1715 from the same flow stats exporter on the hypervisor to the aggregator. As expected, the continuation flow statistics cause the aggregator to generate a delta to add into (lp1, counter index 0) and (lp1, counter index 1). Here, since the flow statistics of the second flow (f2) did not change, the delta is just 0. The flow stats in the report 1715 are stored in the last seen flow statistics table 1620.

In the second stage 1710, two more flow statistics are sent again after some time period in another report 1720 from the same flow stats exporter on the hypervisor to the aggregator. However, there is discontinuity with the statistics of the first flow (f1). In this case, f1's counters (e.g., packet count and byte count) went backwards, indicating that there is discontinuity. This means that the aggregator cannot calculate a delta for f1. So, the statistics for (lp1, counter index 0), remain unchanged. However f2's counters went up and were not discontinuous (e.g., assuming that the duration went up as expected as well). As such, the (lp1, counter index 1) gets the current delta added onto it: (0+(5−2)) and (0+(8−2)).

Figure 18:
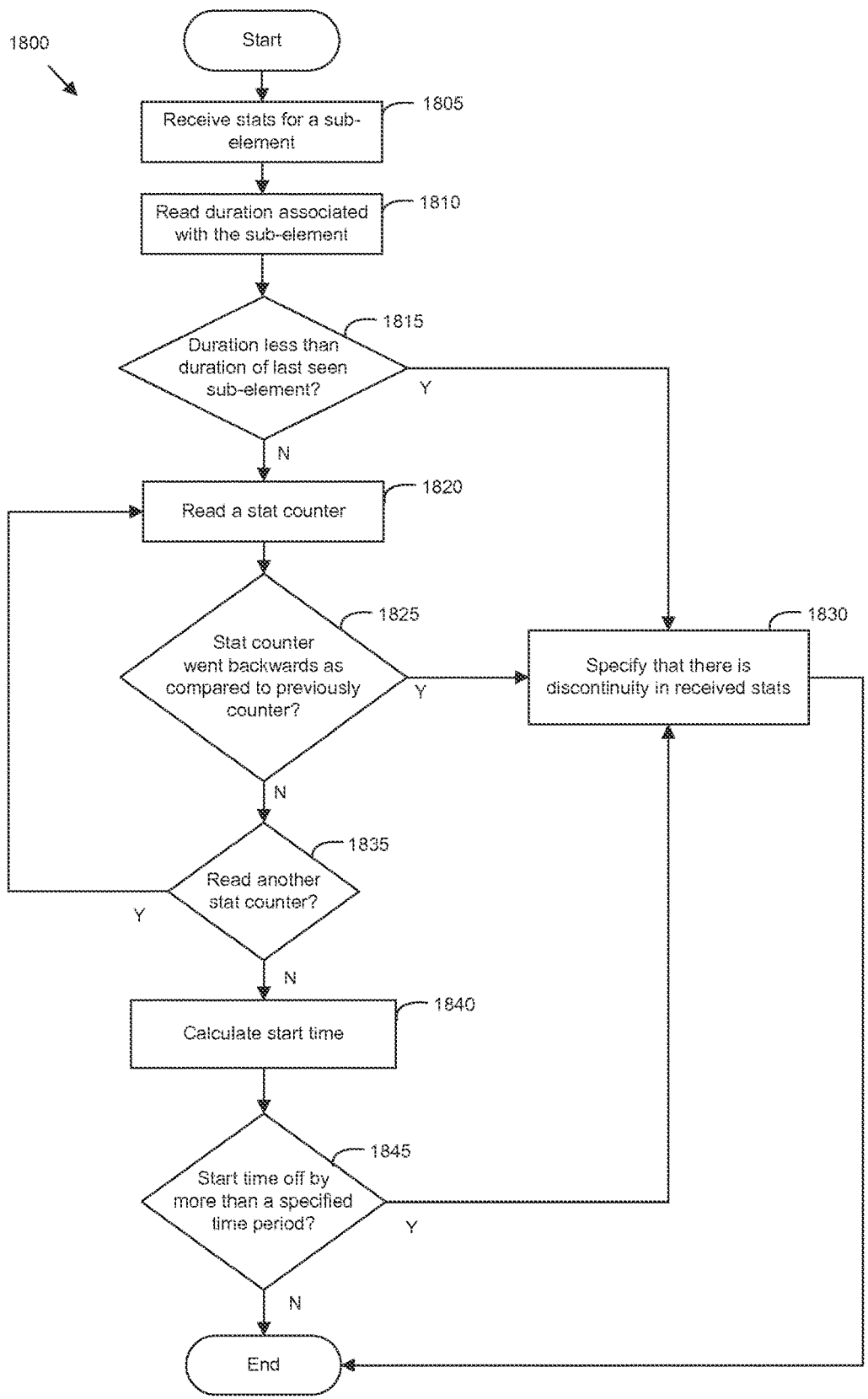
FIG. 18 conceptually illustrates a process that some embodiments perform to detect discontinuity in a received stats report.

FIG. 18 conceptually illustrates a process 1800 that some embodiments perform to detect discontinuity in the current stats report. In some embodiments, the process 1800 is performed by the aggregator described above by reference to FIGS. 1 and 7. As shown, the process 1800 begins when it receives (at 1805) stats for a sub-element. An example of such a sub-element is a flow (e.g., that is associated with a particular marking or tag).

At 1810, the process 1200 reads the duration associated with the sub-element. The process 1800 then determines (1815) if the duration of the sub-element is less than the duration of the last seen sub-element. If the duration is less than the duration of the last seen sub-element, the process 1800 specifies (at 1830) that there is discontinuity in the received stats. The process 1800 then ends. If the duration of the received stats is not less, the process 1800 proceeds to 1820, which is described below.

At 1820, the process 1200 reads a stats counter associated with the sub-element. The process 1800 then compares (at 1825) the current stat counter with a previously received counter to determine if the stats counter went backwards. For instance, the process might check if the value of the current stats counter is less than the value of the previously stored stats counter. If the stats counter went backwards, the process 1800 specifies (at 1830) that there is discontinuity in the received stats. The process 1800 then ends. If the stats counter did not go backwards, the process 1800 proceeds to 1835, which is described below.

At 1835, the process 1800 determines whether to read another stats counter. If so, the process returns to 1820, which is described above. Otherwise, the process 1800 calculates (at 1840) a start time. As mentioned above, the start time can be calculated by subtracting the duration from the dump time. If the start time is off by more than a specified time period, the process 1800 specifies (at 1830) that there is discontinuity in the received stats. The process 1800 then ends. If the start time is not off, the process 1800 has detected no discontinuity in the received stats. Accordingly, the process 1800 ends.

Some embodiments perform variations on the process 1800. The specific operations of the process 1800 may not be performed in the exact order shown and described. The specific operations may not be performed in one continuous series of operations, and different specific operations may be performed in different embodiments. As an example, the process 1800 may validate the duration, the stats counter, and start time in different order. The process 1800 might not perform all of the validation operations (validating the duration, the stats counter, and start time) and may perform only one or even two of the validation operations. Furthermore, the process 1800 could be implemented using several sub-processes, or as part of a larger macro process.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
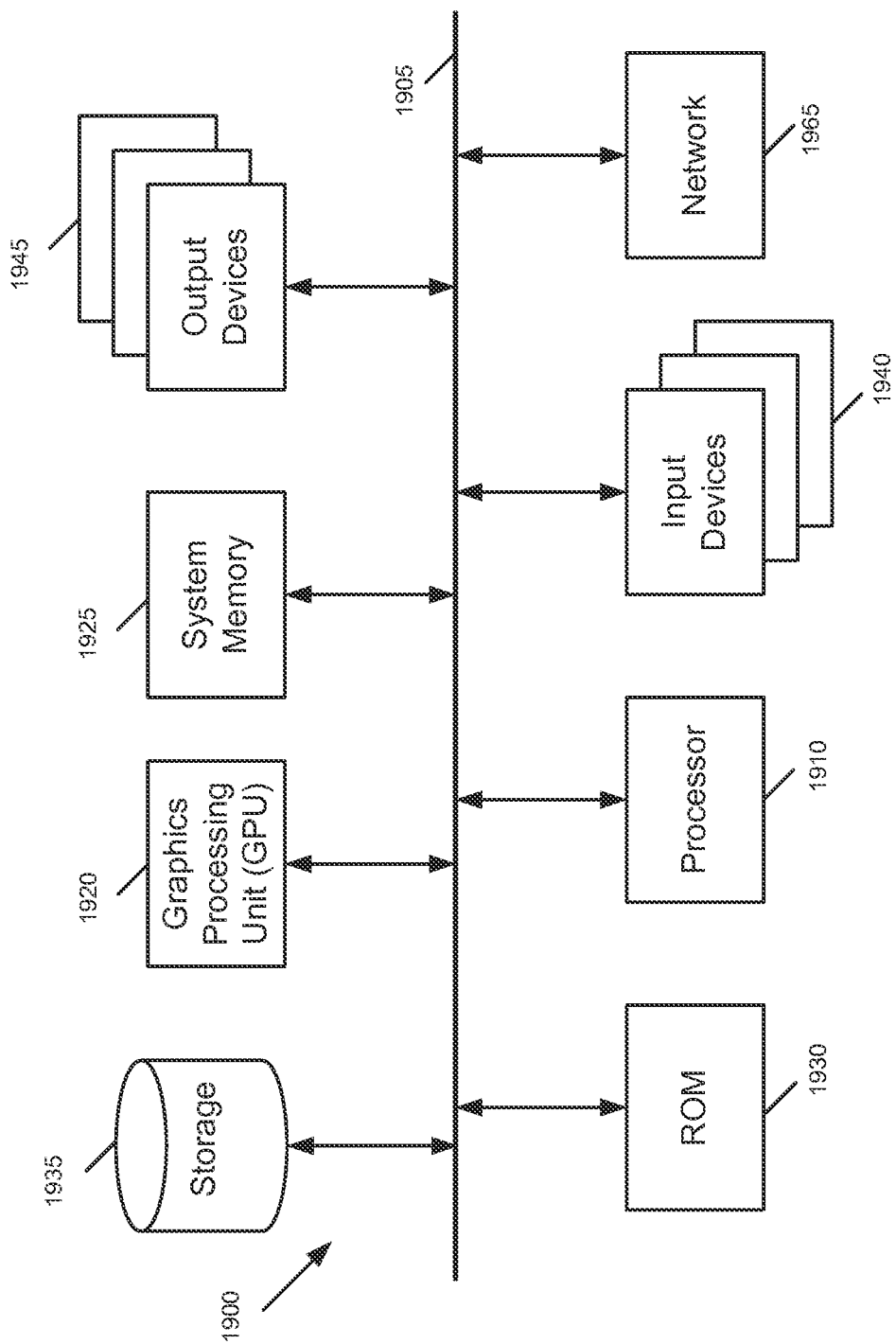
FIG. 19 conceptually illustrates an electronic system with which some embodiments of the invention are implemented.

FIG. 19 conceptually illustrates an electronic system 1900 with which some embodiments of the invention are implemented. The electronic system 1900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash memory device, etc., and its corresponding drive) as the permanent storage device. Like the permanent storage device 1935, the system memory 1925 is a read-and-write memory device. However, unlike storage device 1935, the system memory 1925 is a volatile read-and-write memory, such as a random access memory. The system memory 1925 stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 14, 15, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A host computer comprising:
 a set of processing units for executing instructions;
 a non-transitory machine storing a program for reporting statistics associated with processing packet flows for one or more logical forwarding elements that a particular physical forwarding element executing on the host computer implements with other physical forwarding elements executing on other host computers, the program comprising sets of instructions for, the one or more logical forwarding elements comprising a first logical forwarding element associated with a plurality of physical forwarding element:
  storing flow entries for matching to packets of the packet flows processed by the particular physical forwarding element and storing a tag for each particular flow entry to associate each particular flow entry with one of the one or more the logical forwarding elements, the flow entries comprising a first flow entries associated with the first logical forwarding element and the plurality of physical forwarding element;
  collecting a set of one or more statistics for each particular flow entry based on the packets of the processed flows that match the particular flow entry; and
  exporting, to an external aggregator, the collected set of statistics for each particular flow entry along with the tag in order to associate the collected set of statistics of each particular flow entry with the at least one of the one or more logical forwarding elements.

2. The host computer of claim 1, wherein the external aggregator receives other tagged sets of statistics from the other physical forwarding elements and aggregates the statistics to provide an aggregated set of statistics for one of the one or more the logical forwarding elements.

3. The host computer of claim 1, wherein the particular physical forwarding element implements other logical forwarding elements with the other physical forwarding elements on the other host computers, but for at least one other logical forwarding element, the program does not collect statistics for flow entries for matching to packets of packet flows that it processes for the other logical forwarding element.

4. The host computer of claim 1, wherein the set of instructions for exporting the collected set of statistics comprises a set of instructions for periodically exporting different collected sets of statistics.

5. The host computer of claim 1, wherein the aggregator simulates a virtual sFlow agent for one of the one or more the logical forwarding elements, and export sFlow formatted sampling data to a configured sFlow collector endpoint.

6. The host computer of claim 1, wherein the tag is a first tag, the packet flows are a first set of packet flows, and the tagged flow entries comprise flow entries tagged with the first tag for a first set of packet flows processed for a first logical port of the one or more of the logical forwarding elements.

7. The host computer of claim 6, wherein the flow entries are a first set of flow entries, wherein the program further comprises sets of instructions for:
 storing a second set of flow entries for matching to packets of a second set of packet flows processed by the particular physical forwarding element for a second logical port of the logical forwarding element and storing a second tag for each particular flow entry of the second set of flow entries to associate each particular flow entry of the second set of flow entries with the second logical port;
 collecting a set of one or more statistics for each particular flow entry of the second set of flow entries based on the packets of the processed second set of flows that match the particular flow entry of the second set of flow entries; and
 exporting, to the aggregator, the collected set of statistics for each particular flow entry of the second set of flow entries along with the second tag in order to associate the collected set of statistics for each particular flow entry of the second set of flow entries with the second logical port of the logical forwarding element.

8. The host computer of claim 1, wherein the tag, the packet flows are a first set of packet flows, and the tagged flow entries comprise flow entries tagged with the first tag for the first set of packet flows processed with an ACL (access control list) rule for the logical forwarding element, the tag being associated with multiple related flows.

9. The host computer of claim 1, wherein the tag the packet flows are a first set of packet flows, and the tagged flow entries comprise flow entries tagged with the first tag for the first set of packet flows processed for a first logical entity of the logical forwarding element.

10. The host computer of claim 9, wherein the flow entries are a first set of flow entries, wherein the program further comprises sets of instructions for:
 storing a second set of flow entries for matching to packets of a second set of packet flows processed by the particular physical forwarding element for a second logical entity of the logical forwarding element and storing a second tag for each particular flow entry of the second set of flow entries to associate each particular flow entry of the second set of flow entries with the second logical entity;
 collecting a set of one or more statistics for each particular flow entry of the second set of flow entries based on the packets of the processed second set of flows that match the particular flow entry of the second set of flow entries; and
 exporting, to the aggregator, the collected set of statistics for each particular flow entry of the second set of flow entries along with the second tag in order to associate the collected set of statistics for each particular flow entry of the second set of flow entries with the second logical entity of the logical forwarding element.

11. A method of reporting statistics associated with processing packet flows for a logical forwarding element that a particular physical forwarding element executing on a host computer implements with other physical forwarding elements executing on other host computers, the logical forward element being associated with a plurality of physical forward elements, the method comprising:
 storing flow entries for matching to packets of the packets flows processed by the particular physical forwarding element and storing a tag for each particular flow entry to associate each particular flow entry the maintained records with the logical forwarding element, the flow entries comprising a first flow entries associated with the logical forwarding element and the plurality of physical forwarding element;
 collecting a set of one or more statistics for each particular flow entry based on the packets of the processed flows that match the particular flow entry; and exporting, to an external aggregator, the collected set of statistics for each particular flow entry along with the tag in order to associate the collected set of statistics for each particular flow entry with the logical forwarding element.

12. The method of claim 11, wherein the external aggregator receives other tagged sets of statistics from the other physical forwarding elements and aggregates the statistics to provide an aggregated set of statistics for the logical forwarding element.

13. The method of claim 11, wherein the particular physical forwarding element implements other logical forwarding elements with the other physical forwarding elements on the other host computers, but for at least one other logical forwarding element, the program does not collect statistics for flow entries for matching to packets of packet flows that it processes for the other logical forwarding element.

14. The method of claim 11, wherein exporting the collected set of statistics comprises periodically exporting different collected sets of statistics.

15. The method of claim 11, wherein the aggregator simulates a virtual sFlow agent for the logical forwarding element, and export sFlow formatted sampling data to a configured sFlow collector endpoint.

16. The method of claim 11, wherein the tag is a first tag, the packet flows are a first set of packet flows, and the tagged flow entries comprise flow entries tagged with the first tag for the first set of packet flows processed for a first logical port of the logical forwarding element.

17. The method of claim 16, wherein the flow entries are a first set of flow entries, the method further comprising:
storing a second set of flow entries for matching to packets of a second set of packet flows processed by the particular physical forwarding element for a second logical port of the logical forwarding element and storing a second tag for each particular flow entry of the second set of flow entries to associate each particular flow entry of the second set of flow entries with the second logical port;
collecting a set of one or more statistics for each particular flow entry of the second set of flow entries based on the packets of the processed second set of flows that match the particular flow entry of the second set of flow entries; and
exporting, to the aggregator, the collected set of statistics for each particular flow entry of the second set of flow entries along with the second tag in order to associate the collected set of statistics for each particular flow entry of the second set of flow entries with the second logical port of the logical forwarding element.

18. The method of claim 11, wherein the tag is a first tag, the packet flows are a first set of packet flows, and the tagged flow entries comprise flow entries tagged with the first tag for the first set of packet flows processed with an ACL (access control list) rule for the logical forwarding element.

19. The method of claim 11, wherein the tag is a first tag the packet flows are a first set of packet flows, and the tagged flow entries comprise flow entries tagged with the first tag for the first set of packet flows processed for a first logical entity of the logical forwarding element.

20. The host computer of claim 19 further comprising:
storing a second set of flow entries for matching to packets of a second set of packet flows processed by the particular physical forwarding element for a second logical entity of the logical forwarding element and storing a second tag for each particular flow entry of the second set of flow entries to associate each particular flow entry of the second set of flow entries with the second logical entity;
collecting a set of one or more statistics for each particular flow of the second set of flow entries based on the packets of the processed second set of flows that match the particular flow entry of the second set of flow entries; and
exporting, to the aggregator, the collected set of statistics for each particular flow entry of the second set of flow entries along with the second tag in order to associate the collected set of statistics for each particular flow entry of the second set of flow entries with the second logical forwarding element.

* * * * *